US012566283B2

(12) United States Patent
Jung et al.

(10) Patent No.: US 12,566,283 B2
(45) Date of Patent: Mar. 3, 2026

(54) OPTICAL ABSORBENT

(71) Applicant: LMS CO., LTD., Pyeongtaek-si (KR)

(72) Inventors: Joon Ho Jung, Pyeongtaek-si (KR); Hee Kyeong Kim, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 280 days.

(21) Appl. No.: 18/522,362

(22) Filed: Nov. 29, 2023

(65) Prior Publication Data

US 2024/0210602 A1 Jun. 27, 2024

(30) Foreign Application Priority Data

Nov. 30, 2022 (KR) ........................ 10-2022-0163988

(51) Int. Cl.
*G02B 5/00* (2006.01)
*C08K 5/544* (2006.01)

(52) U.S. Cl.
CPC ............ *G02B 5/003* (2013.01); *C08K 5/5477* (2021.01)

(58) Field of Classification Search
CPC ......... G02B 5/003; G02B 5/22; C08K 5/5477
See application file for complete search history.

(56) References Cited

U.S. PATENT DOCUMENTS

| | | | | |
|---|---|---|---|---|
| 5,614,008 A * | 3/1997 | Escano | C09D 11/30 525/437 |
| 2010/0212737 A1 | 8/2010 | Fuhrmann et al. | |
| 2011/0265878 A1 | 11/2011 | Fuhrmann et al. | |
| 2011/0294118 A1 | 12/2011 | Reddington | |

FOREIGN PATENT DOCUMENTS

| | | | | |
|---|---|---|---|---|
| WO | 2018100834 A1 | 6/2018 | |
| WO | WO2022024941 A1 * | 2/2022 | G02B 5/28 |

OTHER PUBLICATIONS

Enrico Rampazzo, Sara Bonacchi, Damiano Genovese, Veronica Paterlini, Nelsi Zaccheroni, Cécile Dumas-Verdes, Gilles Clavier, Rachel Méallet-Renault, and Luca Prodi, Pluronic-Silica (PluS) Nanoparticles Doped with Multiple Dyes Featuring Complete Energy Transfer, J. Phys. Chem. C 2014, 118, 9261-9267 (Year: 2014).*

* cited by examiner

*Primary Examiner* — Bijan Ahvazi
(74) *Attorney, Agent, or Firm* — NKL LAW; Jae Youn Kim

(57) ABSTRACT

The present invention provides an optical absorbent and its application. The invention provides the optical absorbent, as an organic optical absorbent, exhibiting excellent compatibility or solubility in various solvents and resin components, and having excellent heat resistance thereby providing the optical absorbent capable of stably maintaining optical properties even under high temperature condition or high temperature and high humidity conditions. The present invention can also provide an optical absorption film that obtains desired optical properties by applying the optical absorbent. The present invention may also provide applications of the optical absorbent or the optical absorption film, and may provide, for example, an optical filter, a solid-state image capturing device, and/or an infrared sensor including the optical absorbent or the optical absorption film.

20 Claims, 7 Drawing Sheets

OPTICAL ABSORBENT

CROSS-REFERENCE TO RELATED APPLICATION(S)

The present application is based on and claims priority under 35 U.S.C. 119 to Korean Patent Application No. 10-2022-0163988, filed on Nov. 30, 2022, in the Korean Intellectual Property Office, the disclosure of which is herein incorporated by reference in its entirety.

TECHNICAL FIELD

The present invention relates to an optical absorbent and its use.

BACKGROUND

An optical absorbent, for example, an absorbent capable of absorbing light in the infrared region can be applied to various applications. For example, because an image capturing device or an infrared sensor using a CCD (Charge-Coupled Device) or a CMOS (Complementary Metal-Oxide-Semiconductor) image sensor include a silicon photodiode having sensitivity to the near-infrared region, the optical absorbent may be used for them.

Although there are various methods of applying such an optical absorbent, a method of using coating solution where an optical absorbent dissolved in a solvent and a resin component are mixed is generally applied. Therefore, the optical absorbent needs to exhibit excellent solubility or compatibility with both the solvent and the resin component.

If the solubility or compatibility of the optical absorbent with respect to the solvent or resin component is poor, desired spectral characteristics cannot be obtained for an optical absorption film where the optical absorbent is applied, or its optical properties are deteriorated due to precipitation of the optical absorbent in the optical absorption film. However, it is a difficult task to obtain an optical absorbent that exhibits excellent solubility or compatibility with various types of solvents and resin components at the same time.

The optical absorbent can be divided into an inorganic optical absorbent and an organic optical absorbent. In the case of the organic optical absorbent, it is easy to apply and control the wavelength of light to be absorbed thereby efficiently reducing the transmittance of the desired light.

However, the organic optical absorbent has poor heat resistance compared to the inorganic optical absorbent. Thus, optical properties of the organic optical absorbent or the optical absorption film including the organic optical absorbent may be deteriorated after being exposed to high temperature condition or high temperature and high humidity conditions.

SUMMARY

An object of the present invention provides an optical absorbent and its use. Furthermore, the object of the present invention provides the optical absorbent, as an organic absorbent, showing excellent compatibility or solubility with respect to various solvents and resin components and stably maintaining optical properties even under high temperature condition or high temperature and high humidity conditions due to its excellence in heat resistance.

Another object of the present invention is to obtain desired optical characteristics by applying the optical absorbent.

Another object of the present invention is to provide an application for the optical absorbent. For example, the object of the present invention is to provide applications such as an optical absorption film formed by using the optical absorbent, an optical filter, a solid-state image capturing device, and/or an infrared sensor.

According to an embodiment of the invention, an optical absorbent represented by Chemical Formula 1 is provided:

[Chemical Formula 1]

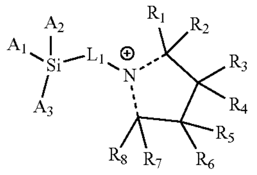

where $A_1$ to $A_3$ are each independently hydrogen, halogen, an alkyl group, an alkenyl group, an alkynyl group, an alkoxy group, an aryl group, or an arylalkyl group; $L_1$ is $-U_1-T_1-U_2-T_2-U_3-$ where $T_1$ and $T_2$ are each independently an oxygen atom or absent and $U_1$ to $U_3$ are each independently an alkylene group, an alkylidene group, an alkenylene group, or an alkynylene group or absent; $R_1$ and $R_2$, $R_1$ to $R_6$, $R_3$ to $R_6$, or $R_5$ to $R_8$ in $R_1$ to $R_8$ form an absorption edge and substituents which do not form the absorption edge among $R_1$ to $R_8$ are each independently hydrogen, halogen, a hydroxyl group, a cyano group, a nitro group, a carboxyl group, an alkyl group, an alkoxy group, an aryl group, an arylalkyl group, an alkylcarbonylamino group, an arylalkylcarbonylamino group, a haloalkylsulfonylamino group, an alkylsulfonylamino group, an arylalkylsulfonylamino group, or an amino group; and two dotted lines in Chemical Formula 1 represent as either a single bond or a double bond, wherein each one of the two dotted lines represents as the single bond and the double bond, respectively, or both the two dotted lines represent as the single bond and a cation symbol in Chemical Formula 1 is absent upon both the dotted lines representing as the single bond.

In an embodiment, an absorption maximum is exhibited within a wavelength range of 600 nm to 950 nm for the optical absorbent in the present invention.

In an embodiment, a molar mass is in a range of 400 g/mol to 2,000 g/mol for the optical absorbent in the present invention.

In an embodiment, the 5% pyrolysis temperature is 150° C. or higher for the optical absorbent in the present invention.

In an embodiment, $A_1$ to $A_3$ in Chemical Formula 1 are each independently an alkyl group, an alkynyl group, an alkenyl group, or an alkoxy group for the optical absorbent in the present invention.

In an embodiment, any one of Conditions 1 to 3 are satisfied:

Condition 1: $T_1$, $T_2$, $U_1$ and $U_3$ are not present, and $U_2$ is an alkylene group, an alkylidene group, an alkenylene group, or an alkynylene group in Chemical Formula 1; Condition 2: $U_1$ and $U_3$ are not present, one of $T_1$ and $T_2$ is oxygen, and the other is not present, and $U_2$ is an alkylene group, an alkylidene group, an alkenylene group, or an alkynylene group in Chemical Formula 1; and Condition 3: $U_3$ and $T_2$ are not present, $T_1$ is an oxygen atom, and $U_1$ and $U_2$ are each independently an alkylene group, an alkylidene group, an alkenylene group, or an alkynylene group for the optical absorbent in the present invention.

In an embodiment, the substituents that do not form absorption edges in $R_1$ to $R_8$ are each independently hydrogen, halogen, a hydroxyl group, a cyano group, a nitro group, a carboxyl group, an alkyl group, alkoxy group, an alkylsulfonylamino group, or an amino group for the optical absorbent in the present invention.

In an embodiment, the optical absorbent is a squarylium-based chemical compound in the present invention.

In an embodiment, the optical absorbent is represented by Chemical Formula 2:

[Chemical Formula 2]

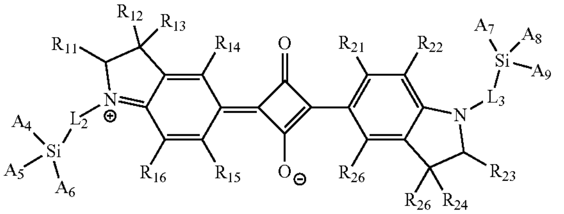

where $A_4$ to $A_9$ are each independently hydrogen, halogen, an alkyl group, an alkenyl group, an alkoxy group, an aryl group, or an arylalkyl group; $L_2$ and $L_3$ are each independently the same as $L_1$ in Chemical Formula 1; and $R_{11}$ to $R_{16}$ and $R_{21}$ to $R_{26}$ are each independently hydrogen, halogen, a hydroxyl group, a cyano group, a nitro group, a carboxyl group, an alkyl group, an alkoxy group, an aryl group, an arylalkyl group, an amino group, an alkylcarbonylamino group, an arylalkylcarbonylamino group, a haloalkylsulfonylamino group, an alkylsulfonylamino group, or an arylalkylsulfonylamino group in the present invention.

In an embodiment, the optical absorbent is represented by Chemical Formula 3:

[Chemical Formula 3]

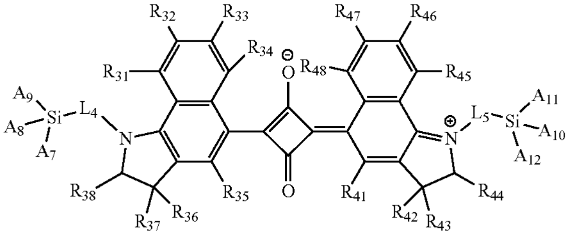

where $A_7$ to $A_{12}$ are each independently hydrogen, halogen, an alkyl group, an alkenyl group, an alkoxy group, an aryl group, or an arylalkyl group; $L_4$ and $L_5$ are each independently the same as $L_1$ in Chemical Formula 1; and $R_{31}$ to $R_{38}$ and $R_{41}$ to $R_{48}$ are each independently hydrogen, halogen, a hydroxyl group, a cyano group, a nitro group, a carboxyl group, an alkyl group, an alkoxy group, an aryl group, an arylalkyl group, an amino group, an alkylcarbonylamino group, an arylalkylcarbonylamino group, a haloalkylsulfonylamino group, an alkylsulfonylamino group, or an arylalkylsulfonylamino group in the present invention.

In an embodiment, the optical absorbent is represented by Chemical Formula 4:

[Chemical Formula 4]

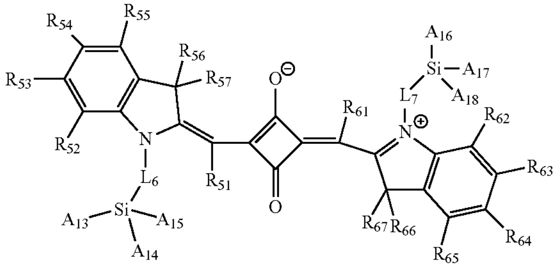

where $A_{13}$ to $A_{18}$ are each independently hydrogen, halogen, an alkyl group, an alkenyl group, an alkoxy group, an aryl group, or an arylalkyl group; $L_6$ and $L_7$ are each independently the same as $L_1$ in Chemical Formula 1; and $R_{51}$ to $R_{57}$ and $R_{61}$ to $R_{67}$ are each independently hydrogen, halogen, a hydroxyl group, a cyano group, a nitro group, a carboxyl group, an alkyl group, an alkoxy group, an aryl group, an arylalkyl group, an amino group, an alkylcarbonylamino group, an arylalkylcarbonylamino group, a haloalkylsulfonylamino group, an alkylsulfonylamino group, or an arylalkylsulfonylamino group in the present invention.

According to another embodiment of the invention, there is provided that an optical absorbent composition comprises a resin component and the optical absorbent.

In another embodiment, the resin component comprises at least one selected from a group consisted of a cyclo olefin polymer (COP)-based resin, a polyarylate resin, a polysulfone resin, a polyether sulfone resin, a polyparaphenylene resin, a polyarylene ether phosphineoxide resin, a polyimide resin, a polyetherimide resin, a polyamideimide resin, an acrylic resin, a polycarbonate resin, a polyethylene naphthalate resin, and a silicone resin for the optical absorbent composition in the present invention.

In another embodiment, the resin component comprises a silicone resin for the optical absorbent composition in the present invention.

In another embodiment, the optical absorbent composition comprises the optical absorbent of 0.001 to 10 parts by weight with respect to 100 parts by weight of the resin component in the present invention.

In another embodiment, the optical absorbent composition further comprises a solvent in the present invention.

According to another embodiment of the invention, there is provided that an optical absorption film comprises a resin component and the optical absorbent.

In another embodiment, the resin component comprises at least one selected from a group consisted of a cyclo olefin polymer (COP)-based resin, a polyarylate resin, a polysulfone resin, a polyether sulfone resin, a polyparaphenylene resin, a polyarylene ether phosphineoxide resin, a polyimide resin, a polyetherimide resin, a polyamideimide resin, an acrylic resin, a polycarbonate resin, a polyethylene naphthalate resin, and a silicone resin for the optical absorption film in the present invention.

In another embodiment, the resin component comprises a silicone resin for the optical absorption film in the present invention.

In another embodiment, an absorption maximum is exhibited within a wavelength range of 600 nm to 950 nm for the optical absorption film in the present invention.

In another embodiment, an absolute value of ΔA of Equation 1 is 20% or less:

$$\Delta A=100\times(A_f-A_i)/A_i, \quad \text{[Equation 1]}$$

where $A_f$ is a transmittance at the absorption maximum wavelength of the optical absorption film being maintained at 85° C. and under 85% relative humidity for 120 hours; $A_i$ is a transmittance at the absorption maximum wavelength of the optical absorption film before being maintained at 85° C. and under 85% relative humidity for 120 hours; and the absorption maximum wavelength exists within a wavelength range of 600 nm to 950 nm for the optical absorption film in the present invention.

In another embodiment, an absolute value of Δλ of Equation 2 is 10% or less:

$$\Delta\lambda=100\times(\lambda_f-\lambda_i)/\lambda_i, \quad \text{[Equation 2]}$$

where $\lambda_f$ is the maximum absorption wavelength of the optical absorption film being maintained at 85° C. and under 85% relative humidity for 120 hours; $\lambda_i$ is the maximum absorption wavelength of the optical absorption film before being maintained at 85° C. and under 85% relative humidity for 120 hours; and the absorption maximum wavelength exists within a wavelength range of 600 nm to 950 nm for the optical absorption film in the present invention.

In another embodiment, the optical absorption film comprises the optical absorbent of 0.001 to 10 parts by weight with respect to 100 parts by weight of the resin component in the present invention.

According to another embodiment of the invention, there is provided that an optical filter comprises a substrate; and the optical absorption film formed on one or both surfaces of the substrate.

According to another embodiment of the invention, there is provided that an image capturing device comprises the optical filter.

According to another embodiment of the invention, there is provided that an infrared sensor comprises the optical absorption film.

DETAILED DESCRIPTION

Figure 1:
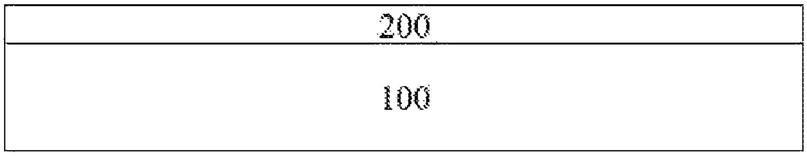
FIGS. 1 to 3 are schematics showing an exemplary structure of an optical filter of the present invention.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

For those physical properties mentioned in specification where temperature may affect the result of measuring, it is measured at room temperature unless otherwise specified. The term "room temperature" used in the specification refers to a natural temperature that is not heated or not reduced, for example, it means any temperature within the range of 10° C. to 30° C., a temperature of about 23° C. or about 25° C. In addition, in the specification, the unit of temperature is Celsius (° C.) unless otherwise specified.

For those physical properties mentioned in the specification where pressure may affect the result of measuring, it is measured at atmospheric pressure unless otherwise specified. The term "atmospheric pressure" is a natural pressure that is not pressurized or depressurized. It usually means about 1 atmosphere of atmospheric pressure having the value of about 740 mmHg to 780 mmHg.

In the specification, in case of a physical property in which the humidity affects the measured result, the physical property is a physical property measured at natural humidity that is not specifically controlled at the room temperature and/or atmosphere pressure.

In the case where an optical characteristic (e.g., refractive index) referred to in the present invention is a characteristic that varies depending on the wavelength, the optical characteristic is a result obtained for light having a wavelength of 520 nm unless otherwise specified.

The term "transmittance," "reflectance," or "absorbance" used in the present invention means an actual transmittance (measured transmittance), an actual reflectance (measured reflectance), or an actual absorbance (measured absorbance) confirmed at a specific wavelength unless otherwise specified.

The term "transmittance," "reflectance," or "absorbance" used in the present invention is a value measured using an ultraviolet and visible spectrophotometer and means the transmittance, the reflectance, or the absorbance for light at an incident angle of 0° based on the normal of the measurement target surface unless the incident angle is specifically specified.

In the present invention, the term "average transmittance" is a result of obtaining an arithmetic average of the measured transmittances after measuring transmittance of each wavelength while increasing the wavelength by 1 nm from the shortest wavelength within a predetermined wavelength region unless otherwise specified. For example, the average transmittance within the wavelength range of 350 nm to 360 nm is an arithmetic average of transmittance measured at the wavelength of 350 nm, 351 nm, 352 nm, 353 nm, 354 nm, 355 nm, 356 nm, 357 nm, 358 nm, 359 nm and 360 nm.

In the specification, the term "maximum transmittance" refers to the maximum transmittance when the transmittance of each wavelength is measured while increasing the wavelength by 1 nm from the shortest wavelength within a predetermined wavelength region. For example, the maximum transmittance within the wavelength range of 350 nm to 360 nm is the highest transmittance among transmittances measured at the wavelength of 350 nm, 351 nm, 352 nm, 353 nm, 354 nm, 355 nm, 356 nm, 357 nm, 358 nm, 359 nm and 360 nm.

In the present invention, the term "average reflectance" is a result of obtaining an arithmetic average of the measured reflectances after measuring reflectance of each wavelength while increasing the wavelength by 1 nm from the shortest wavelength within a predetermined wavelength region unless otherwise specified. For example, the average reflectance within the wavelength range of 350 nm to 360 nm is an arithmetic average of reflectance measured at the wavelength of 350 nm, 351 nm, 352 nm, 353 nm, 354 nm, 355 nm, 356 nm, 357 nm, 358 nm, 359 nm and 360 nm.

In the specification, the term "maximum reflectance" refers to the maximum reflectance when the reflectance of each wavelength is measured while increasing the wavelength by 1 nm from the shortest wavelength within a predetermined wavelength region. For example, the maximum reflectance within the wavelength range of 350 nm to 360 nm is the highest reflectance among reflectances measured at the wavelength of 350 nm, 351 nm, 352 nm, 353 nm, 354 nm, 355 nm, 356 nm, 357 nm, 358 nm, 359 nm and 360 nm.

In the present invention, the term "average absorbance" is a result of obtaining an arithmetic average of the measured absorbances after measuring absorbance of each wavelength while increasing the wavelength by 1 nm from the shortest wavelength within a predetermined wavelength region unless otherwise specified. For example, the average absorbance within the wavelength range of 350 nm to 360 nm is an arithmetic average of absorbance measured at the wavelength of 350 nm, 351 nm, 352 nm, 353 nm, 354 nm, 355 nm, 356 nm, 357 nm, 358 nm, 359 nm and 360 nm.

In the specification, the term "maximum absorbance" refers to the maximum absorbance when the absorbance of each wavelength is measured while increasing the wavelength by 1 nm from the shortest wavelength within a predetermined wavelength region. For example, the maximum absorbance within the wavelength range of 350 nm to 360 nm is the highest absorbance among absorbances measured at the wavelength of 350 nm, 351 nm, 352 nm, 353 nm, 354 nm, 355 nm, 356 nm, 357 nm, 358 nm, 359 nm and 360 nm.

In the specification, the term "incident angle" used in the present invention is an angle based on normal to a surface to be evaluated. For example, a transmittance at an incident angle of 0° of the optical filter means the transmittance for light incident in a direction parallel to the normal of the optical filter surface. Also, a transmittance at an incident angle of 40° is the transmittance for the incident light forming an angle of 40° in the clockwise or the counterclockwise direction with respect to the normal of the optical filter surface. This definition of the incident angle is equally applied to other characteristics such as transmittance.

In the specification, the term "alkyl group" means an alkyl group having 1 to 20 carbon numbers, 1 to 16 carbon numbers, 1 to 12 carbon numbers, 1 to 8 carbon numbers, or 1 to 4 carbon numbers. The alkyl group can be straight-chain, branched-chain or cyclic. The alkyl group may optionally be substituted with one or more substituents. These contents are applied to all alkyl groups mentioned in the specification unless otherwise specified.

In the specification, the term "alkoxy group" means an alkoxy group having 1 to 20 carbon numbers, 1 to 16 carbon numbers, 1 to 12 carbon numbers, 1 to 8 carbon numbers, or 1 to 4 carbon numbers. The alkoxy group can be straight-chain, branched-chain or cyclic. The alkoxy group may be optionally substituted with one or more substituents. These contents are applied to all alkoxy groups mentioned in the specification unless otherwise specified.

In the specification, the term "alkenyl group" means an alkenyl group having 2 to 20 carbon numbers, 2 to 16 carbon numbers, 2 to 12 carbon numbers, 2 to 8 carbon numbers, or 2 to 4 carbon numbers. The alkenyl group can be straight-chain, branched-chain or cyclic. The alkenyl group may be optionally substituted with one or more substituents. These contents apply to all alkenyl groups mentioned in the specification unless otherwise specified.

In the specification, the term "alkynyl group" means an alkynyl group having 2 to 20 carbon numbers, 2 to 16 carbon numbers, 2 to 12 carbon numbers, 2 to 8 carbon numbers, or 2 to 4 carbon numbers. The alkynyl group can be straight-chain, branched-chain or cyclic. The alkynyl group may be optionally substituted with one or more substituents. These contents are applied to all alkynyl groups mentioned in the specification unless otherwise specified.

In the specification, the term "aryl group" means a monovalent moiety derived from an aromatic hydrocarbon, and the aryl group may be an aryl group having 6 to 36 carbon numbers, 6 to 30 carbon numbers, 6 to 24 carbon numbers, 6 to 18 carbon numbers, or 6 to 12 carbon numbers. It may be, for example, a phenyl group, a tolyl group, a xylyl group, or a naphthyl group. The aryl group may optionally be substituted by one or more substituents. These contents are applied to all aryl groups mentioned in the specification unless otherwise specified.

In the specification, the term "arylalkyl group" means an alkyl group substituted with at least one or more aryl groups. In this case, specific types of the alkyl group and the aryl group are as described above. These contents apply to all arylalkyl groups mentioned in the specification unless otherwise specified.

In the specification, the term "alkylidene group" is a divalent functional group in which two hydrogens are removed from an alkane and means a functional group in which the hydrogen atom is removed from one carbon of the alkane. The alkylidene group may be an alkylidene group having 1 to 20 carbon numbers, 1 to 16 carbon numbers, 1 to 12 carbon numbers, 1 to 8 carbon numbers, or 1 to 4 carbon numbers. The alkylidene group can be straight-chain, branched-chain or cyclic. The alkylidene group may be optionally substituted with one or more substituents. These contents apply to all alkylidene groups mentioned in the specification unless otherwise specified.

In the specification, the term "alkylene group" is a divalent functional group in which two hydrogens are removed from an alkane and means a functional group in which one hydrogen atom is removed from each of two different carbon of the alkane. Such an alkylene group may be an alkylene group having 2 to 20 carbon numbers, 2 to 16 carbon numbers, 2 to 12 carbon numbers, 2 to 8 carbon numbers, or 2 to 4 carbon numbers. The alkylene group can be straight-chain, branched-chain or cyclic. The alkylene group may be optionally substituted with one or more substituents. These contents are applied to all alkylene groups mentioned in the specification unless otherwise specified.

In the specification, the term "alkenylene group" means an alkenylene group having 2 to 20 carbon numbers, 2 to 16 carbon numbers, 2 to 12 carbon numbers, 2 to 8 carbon numbers, or 2 to 4 carbon numbers. The alkenylene group can be straight-chain, branched-chain or cyclic. The alkenylene group may be optionally substituted with one or more substituents. These contents apply to all alkenylene groups mentioned in the specification unless otherwise specified.

In the specification, the term "alkynylene group" may be an alkynylene group having 2 to 20 carbon numbers, 2 to 16 carbon numbers, 2 to 12 carbon numbers, 2 to 8 carbon numbers, or 2 to 4 carbon numbers. The alkynylene group can be straight-chain, branched-chain or cyclic. The alkynylene group may be optionally substituted with one or more substituents. These contents apply to all alkynylene groups mentioned in the specification unless otherwise specified.

The present invention relates to an optical absorbent. The term "optical absorbent" means a chemical compound capable of absorbing light in a certain wavelength range.

The optical absorbent of the present invention may be a chemical compound represented by Chemical Formula 1 or a chemical compound including a site represented by Chemical Formula 1.

The optical absorbent may exhibit desired optical properties along with excellent heat resistance and may exhibit excellent compatibility with a resin component and/or a solvent because of a silyl group connected to a nitrogen atom in the Chemical Formula 1.

[Chemical Formula 1]

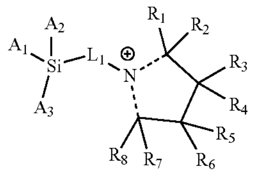

In Chemical Formula 1, $A_1$ to $A_3$ may each independently be hydrogen, halogen, an alkyl group, an alkenyl group, an alkynyl group, an alkoxy group, an aryl group, or an arylalkyl group.

In Chemical Formula 1, $L_1$ may be a divalent functional group represented by $-U_1-T_1-U_2-T_2-U_3-$. In the divalent functional group, $T_1$ and $T_2$ may each independently be an oxygen atom or absent and $U_1$ to $U_3$ may each independently be an alkylene group, an alkylidene group, an alkenylene group, or an alkynylene group or absent. Absence of a certain code above means that atoms on both sides of the corresponding code are directly connected. For example, in the above, when an element other than $T_1$ is present and $T_1$ is not present, the divalent functional group may be represented by $-U_1-U_2-T_2-U_3-$.

In Chemical Formula 1, $R_1$ and $R_2$, $R_1$ to $R_6$, $R_3$ to $R_6$, or $R_5$ to $R_8$ in $R_1$ to $R_8$ may be connected to an absorption edge or may form the absorption edge together.

Being connected to an absorption edge or forming an absorption edge as stated above means that the optical absorbent of the present invention can have a structure capable of exhibiting characteristics of absorbing light of a desired wavelength entirely by the structure where $R_1$ and $R_2$, $R_1$ to $R_6$, $R_3$ to $R_6$, or $R_5$ to $R_8$ are connected or formed. The absorption edge for this case will be described below.

In Chemical Formula 1, other substituents which are connected to the absorption edge or do not forms the absorption edge in $R_1$ to $R_8$ may be each independently hydrogen, halogen, a hydroxyl group, a cyano group, a nitro group, a carboxyl group, an alkyl group, an alkoxy group, an aryl group, an arylalkyl group, an alkylcarbonylamino group, an arylalkylcarbonylamino group, an alkylsulfonylamino group, a haloalkylsulfonylamino group, an arylalkylsulfonylamino group, or an amino group.

In Chemical Formula 1, a dotted line represents that the dotted line is a single bond between nitrogen and carbon or a double bond between nitrogen and carbon. However, the two dotted lines in Chemical Formula 1 do not form the double bond. That is, when a double bond exists, one of the two dotted lines is the double bond, and the other is the single bond. In addition, when the two dotted lines of Chemical Formula 1 are both single bonds, the cation symbol of Chemical Formula 1 is absent.

In the above, the absorption edge refers to a region where the optical absorbent has a structure capable of absorbing light of a desired wavelength entirely. For example, the absorption edge may be a frame or structure having a so-called resonance structure and/or a conjugated bond.

The light absorption by an optical absorbent, especially an organic optical absorbent, is explained as being caused by the energy difference (ΔE) between the ground state and the transition state and this difference is also explained as energy difference between HOMO (Highest Unoccupied Molecular Orbital) and LUMO (Lowest Unoccupied Molecular Orbital).

In general, an organic optical absorbent includes a resonance structure and/or a conjugated bond as an absorption edge capable of exhibiting a light absorption effect. Accordingly, in $R_1$ to $R_8$, $R_1$ and $R_2$, $R_1$ to $R_6$, $R_3$ to $R_6$, or $R_5$ to $R_8$ are connected to or form together a frame that enables the optical absorbent having the resonance structure and/or conjugated bond to exhibit desired light absorption characteristics entirely.

In the present invention, specific types of the absorption edge or the frame as described above is not particularly limited. As is known, a resonance effect refers to an interaction between a lone electron pair of a molecule and an adjacent x-bonded electron pair, and a substituent or a frame that causes this resonance effect are known. In addition, it is known that a conjugated bond is a system composed of two or more double bonds with one single bond interposed therebetween, and as the number of conjugated bonds increases, the energy difference decreases, and the absorption band shifts to a longer wavelength region.

For example, the absorption edge may be a frame or a structure that allows the chemical compound of the present invention to exhibit an absorption maximum within a wavelength range of 600 nm to 950 nm. That is, the chemical compound may exhibit an absorption maximum within a wavelength range of 600 nm to 950 nm. In another example, the lower limit of the absorption maximum wavelength may be 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, or 790 nm. In addition, the upper limit of the absorption maximum wavelength may be 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, or 610 nm. The absorption maximum wavelength may be within a range of more than or equal to any one of the lower limits described above and less than or equal to any one of the upper limits described above.

As described above, the resonance structure and the conjugated bond determine the energy difference (ΔE) between the ground state and the excited state of the chemical compound or between the highest unoccupied molecular orbital (HOMO) and the lowest unoccupied molecular orbital (LUMO). Since the maximum absorption wavelength is determined by this energy difference, the structure of the absorption edge can be determined so that the chemical compound can have the absorption maximum wavelength in the above-described range.

An alkyl group, an alkenyl group, an alkynyl group, an alkoxy group, an aryl group, an arylalkyl group, an alkylene group, an alkylidene group, an alkenyl group, an alkynyl group, an alkylcarbonylamino group, an arylalkylcarbonylamino group, a haloalkylsulfonylamino group, an arylalkylsulfonylamino group, an alkylsulfonylamino group, and an amino group in Chemical Formula 1 may be optionally substituted by one or more substituents. In this case, the substituted substituents may be exemplified to include halogen such as fluorine and chlorine, an alkyl group, an alkenyl group, an alkynyl group, an alkoxy group, an aryl group, an arylalkyl group, a hydroxyl group, a cyano group, a nitro group, a carboxyl group, an alkylcarbonylamino group, an arylalkylcarbonylamino group, an arylalkylsulfonylamino group, an alkylsulfonylamino group, or an amino group, etc., but are not limited to.

In Chemical Formula 1, $A_1$ to $A_3$ may each independently be an alkyl group, an alkynyl group, an alkenyl group, an alkoxy group, or an alkyl group in a suitable example, but are not limited to.

In Chemical Formula 1, the divalent functional group represented by $-U_1-T_1-U_2-T_2-U_3-$ may satisfy any one of the following Conditions 1 to 3 in a suitable example.

For example, the divalent functional group may be a functional group where $T_1$, $T_2$, $U_1$ and $U_3$ are not present, and $U_2$ may be an alkylene group, an alkylidene group, an alkenylene group, or an alkynylene group (Condition 1). In this case, the divalent functional group may be represented by $-U_2-$.

In another example, the divalent functional group may be a functional group where $U_1$ and $U_3$ are not present, one of $T_1$ and $T_2$ is oxygen, the other is not present, and $U_2$ may be an alkylene group, an alkylidene group, an alkenylrene group, or an alkynylene group (Condition 2). In this case, the divalent functional group becomes a functional group represented by $-O-U_2-$ or $-U_2-O-$.

In another example, the divalent functional group may be a functional group where $U_3$ and $T_2$ are not present, $T_1$ is an oxygen atom, and $U_1$ and $U_2$ may be each independently an alkylene group, an alkylidene group, an alkenylene group, or an alkynylene group (Condition 3). In this case, the functional group becomes a functional group represented by $-U_1-O-U_2-$.

In Chemical Formula 1, the substituents that do not form or are not linked to the absorption edge in $R_1$ to $R_8$ may be independently hydrogen, halogen, a hydroxyl group, a cyano group, a nitro group, a carboxyl group, an alkyl group, an alkoxy group, an alkylsulfonylamino group, or an amino group or hydrogen, an alkyl group, an alkylsulfonylamino group, or an amino group in a suitable example, but are not limited to.

The chemical compound (optical absorbent) of the present invention may have an appropriate level of molar mass. For example, the lower limit of the molar mass may be 400 g/mol, 450 g/mol, 500 g/mol, 550 g/mol, 600 g/mol, 650 g/mol, 700 g/mol or 750 g/mol. The upper limit of the molar mass may be 2,000 g/mol, 1,900 g/mol, 1,800 g/mol, 1,700 g/mol, 1,600 g/mol, 1,500 g/mol, 1,400 g/mol, 1,300 g/mol, 1,200 g/mol, 1,100 g/mol, 1,000 g/mol, 950 g/mol, 900 g/mol, 850 g/mol or 800 g/mol. The molar mass may be within a range equal to or greater than any one of the lower limits described above and equal to or less than any one of the upper limits described above.

The optical absorbent may have excellent heat resistance. For example, the optical absorbent may have the 5% pyrolysis temperature (referred to as "Td 5%") within a predetermined range. For example, the lower limit of the Td 5% of the optical absorbent may be about 150° C., 160° C., 170° C., 180° C., 190° C., 200° C., 210° C., 220° C., 230° C., 240° C., 250° C., 255° C., or 260° C. The upper limit of Td 5% may be about 400° C., 380° C., 360° C., 340° C., 320° C., 300° C., 280° C., 275° C., 270° C., 265° C., 260° C., 255° C., or 240° C. may be within a range of more than or equal to any one of the lower limits described above and less than or equal to any one of the upper limits described above.

The Td 5% is a value obtained through Thermogravimetric Analysis (TGA). It is a value (Td 5%) at the weight loss of 95% confirmed in a temperature range of 25° C. to 800° C., with a heating rate of 10° C./min and under nitrogen (N2) atmosphere condition of 60 $cm^3$/min.

The optical absorbent of the present invention, in one example, may be a so-called squarylium-based chemical compound. That is, the structure of Chemical Formula 1 may form a frame of the squarylium-based chemical compound together with the absorption edge.

In this case, the optical absorbent may be a chemical compound represented by Chemical Formula 2 in one example.

[Chemical Formula 2]

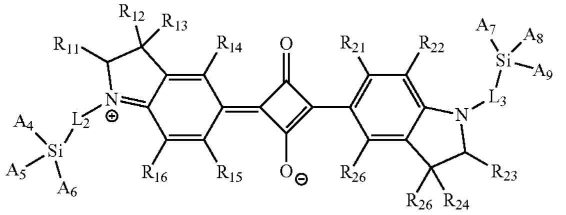

The structure of Chemical Formula 2 may be formed where $R_1$ to $R_6$, $R_3$ to $R_6$, or $R_5$ to $R_8$ in the structure of Chemical Formula 1 are connected to an absorption edge or form an absorption edge.

In Chemical Formula 2, $A_4$ to $A_9$ may each independently be hydrogen, halogen, an alkyl group, an alkenyl group, an alkoxy group, an aryl group, or an arylalkyl group.

In Chemical Formula 2, $L_2$ and $L_3$ may each independently be the same substituent as $L_1$ (including appropriate examples) in Chemical Formula 1.

In Chemical Formula 2, $R_{11}$ to $R_{16}$ and $R_{21}$ to $R_{26}$ may be each independently hydrogen, halogen, a hydroxyl group, a cyano group, a nitro group, a carboxyl group, an alkyl group, an alkoxy group, an aryl group, an arylalkyl group, an alkylcarbonylamino group, a haloalkylsulfonylamino group, an arylalkylcarbonylamino group, an alkylsulfonylamino group, an amino group, or an arylalkylsulfonylamino group.

In Chemical Formula 2, an alkyl group, an alkenyl group, an alkynyl group, an alkoxy group, an aryl group, an arylalkyl group, an alkylene group, an alkylidene group, an alkenyl group, an alkynyl group, an alkylcarbonylamino group, an arylalkylcarbonylamino group, an arylalkylsulfonylamino group, an alkylsulfonylamino group and an amino group may be optionally substituted by one or more substituents. In this case, the substituted substituents may be exemplified to include halogen such as fluorine and chlorine, an alkyl group, an alkenyl group, an alkynyl group, an alkoxy group, an aryl group, an arylalkyl group, a hydroxyl group, a cyano group, a nitro group, a carboxyl group, an alkylsulfonylamino group, or an amino group, but are not limited to.

In Chemical Formula 2, $A_4$ to $A_9$ may each independently be an alkyl group, an alkynyl group, an alkenyl group, an alkoxy group, or an alkyl group in a suitable example, but are not limited to.

In Chemical Formula 2, $R_{11}$ to $R_{16}$ and $R_{21}$ to $R_{26}$ may each independently be hydrogen, halogen, a hydroxyl group, a cyano group, a nitro group, a carboxyl group, an alkyl group, an alkoxy group, an alkylsulfonylamino group, or an amino group or hydrogen, an alkyl group, an alkylsulfonylamino group, or an amino group in a suitable example, but are not limited to.

The chemical compound in Chemical Formula 2 may have the above-described absorption maximum wavelength, molar mass and/or Td 5%.

In another example, the optical absorbent may be a chemical compound represented by Chemical Formula 3.

[Chemical Formula 3]

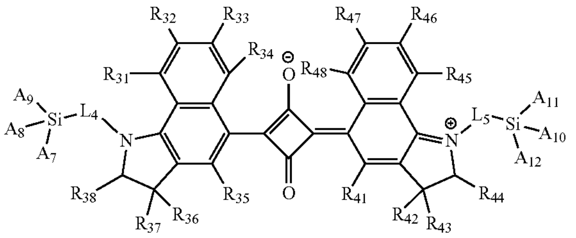

The structure of Chemical Formula 3 may be formed where $R_1$ to $R_6$, $R_3$ to $R_6$, or $R_5$ to $R_8$ in the structure of Chemical Formula 1 are connected to an absorption edge or form an absorption edge.

In Chemical Formula 3, $A_7$ to $A_{12}$ may each independently be hydrogen, halogen, an alkyl group, an alkenyl group, an alkoxy group, an aryl group, or an arylalkyl group.

In Chemical Formula 3, $L_4$ and $L_5$ may each independently be the same substituent as $L_1$ (including appropriate examples) in Chemical Formula 1.

In Chemical Formula 3, $R_{31}$ to $R_{38}$ and $R_{41}$ to $R_{48}$ may each independently be hydrogen, halogen, a hydroxyl group, a cyano group, a nitro group, a carboxyl group, an alkyl group, an alkoxy group, an alkylcarbonylamino group, an arylalkylcarbonylamino group, a haloalkylsulfonylamino group, an amino group, an arylalkylsulfonylamino group, an alkylsulfonylamino group, an aryl group, or an arylalkyl group.

In Chemical Formula 3, an alkyl group, an alkenyl group, an alkynyl group, an alkoxy group, an aryl group, an arylalkyl group, an alkylene group, an alkylidene group, an alkenyl group, an alkynyl group, an alkylcarbonylamino group, an arylalkylcarbonylamino group, an arylalkylsulfonylamino group, an alkylsulfonylamino group, and an amino group may be optionally substituted by one or more substituents. In this case, the substituted substituents may be exemplified to include halogen such as fluorine and chlorine, an alkyl group, an alkenyl group, an alkynyl group, an alkoxy group, an aryl group, an arylalkyl group, a hydroxyl group, a cyano group, a nitro group, a carboxyl group, an alkylsulfonylamino group, or an amino group, but are not limited to.

In Chemical Formula 3, $A_7$ to $A_{12}$ may each independently be an alkyl group, an alkynyl group, an alkenyl group, an alkoxy group, or an alkyl group in a suitable example, but are not limited to.

In Chemical Formula 3, $R_{31}$ to $R_{38}$ and $R_{41}$ to $R_{48}$ may each independently be hydrogen, halogen, a hydroxyl group, a cyano group, a nitro group, a carboxyl group, an alkyl group, an alkoxy group, an alkylsulfonylamino group, or an amino group or hydrogen, an alkyl group, an alkylsulfonylamino group, or an amino group in a suitable example, but are not limited to.

The chemical compound in Chemical Formula 3 may have the above-described maximum absorption wavelength, molar mass, and/or Td 5%.

In another example, the optical absorbent may be a chemical compound represented by Chemical Formula 4.

[Chemical Formula 4]

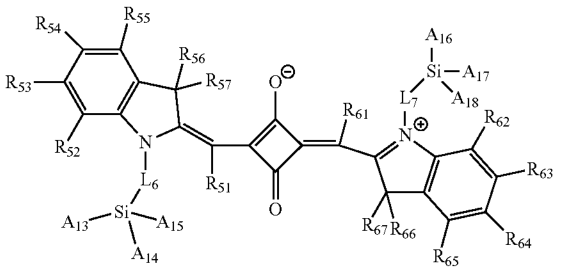

The structure of Chemical Formula 4 may be formed where $R_1$ and $R_2$ in the structure of Chemical Formula 1 are connected to an absorption edge or form an absorption edge.

In Chemical Formula 4, $A_{13}$ to $A_{18}$ may each independently be hydrogen, halogen, an alkyl group, an alkenyl group, an alkoxy group, an aryl group, or an arylalkyl group.

In Chemical Formula 4, $L_6$ and $L_7$ may each independently be the same substituent as $L_1$ (including appropriate examples) in Chemical Formula 1.

In Chemical Formula 4, $R_{51}$ to $R_{57}$ and $R_{61}$ to $R_{67}$ may each independently be hydrogen, halogen, a hydroxyl group, a cyano group, a nitro group, a carboxyl group, an alkyl group, an alkoxy group, an aryl group, an amino group, an alkylcarbonylamino group, a haloalkylsulfonylamino group, an arylalkylcarbonylamino group, an alkylsulfonylamino group, an arylalkylsulfonylamino group, or an arylalkyl group.

In Chemical Formula 4, an alkyl group, alkenyl group, an alkynyl group, an alkoxy group, an aryl group, an arylalkyl group, an alkylene group, an alkylidene group, an alkenyl group, an alkynyl group, an alkylcarbonylamino group, an arylalkylcarbonylamino group, an arylalkylsulfonylamino group, an alkylsulfonylamino group, and an amino group may be optionally substituted by one or more substituents. In this case, the substituted substituents may be exemplified to include halogen such as fluorine and chlorine, an alkyl group, an alkenyl group, an alkynyl group, an alkoxy group, an aryl group, an arylalkyl group, a hydroxyl group, a cyano group, a nitro group, a carboxyl group, an alkylsulfonylamino group, or an amino group, but are not limited to.

In Chemical Formula 4, $A_{13}$ to $A_{18}$ may each independently be an alkyl group, an alkynyl group, an alkenyl group, or an alkoxy group in a suitable example, but are not limited to.

In Chemical Formula 4, $R_{51}$ to $R_{57}$ and $R_{61}$ to $R_{67}$ may each independently be hydrogen, halogen, a hydroxyl group, a cyano group, a nitro group, a carboxyl group, an alkyl group, an alkoxy group, an alkylsulfonylamino group, or an amino group or hydrogen, an alkyl group, an alkylsulfonylamino group, or an amino group, but are not limited to.

The chemical compound in Chemical Formula 4 may have the above-described absorption maximum wavelength, molar mass and/or Td 5%.

In the present invention, a method for preparing the optical absorbent, for example, the optical absorbents of Chemical Formulas 2 to 4 are not particularly limited.

In the industry, various methods for preparing squarylium-based chemical compounds are known, and in the present invention, a chemical compound having a desired structure may be synthesized by referring to such known methods.

The present invention also relates to an optical absorbent composition comprising the optical absorbent. The term "optical absorbent composition" may refer to a mixture comprising an optical absorbent and other components or a mixture comprising two or more optical absorbents.

The optical absorbent composition basically includes the optical absorbent of Chemical Formula 1 and may further include other necessary components. For example, the optical absorbent composition may further include a resin component serving as a binder. There is no particular limitation for the type of resin component applied in this case, and a known resin component can be utilized to form an optical absorption film, for example, a near-infrared absorption film. In the present invention, the optical absorbent component may exhibit appropriate compatibility or solubility with respect to various known resin components.

Examples of the resin component include a cyclo olefin polymer (COP) resin, a polyarylate resin, a polysulfone resin, a polyether sulfone resin, a polyparaphenylene resin, a polyarylene ether phosphine oxide resin, a polyimide resin, a polyetherimide resin, a polyamideimide resin, an acrylic resin, a polycarbonate resin, a polyethylene naphthalate resin, or a silicone resin or one or more of various other organic resins or organic-inorganic hybrid resins, but are not limited to.

Although not particularly limited, the optical absorbent of the present invention may be mixed with a silicone resin among resin components serving as the known binder to form an optical absorption film exhibiting excellent performance. Therefore, in one example, the resin component may be a silicone resin.

In the case where the resin component is applied, there is no particular limitation for its ratio. For example, the resin component may be present such that a weight ratio of the optical absorbent with respect to 100 parts by weight of the resin component may be in the range of 0.001 parts by weight to 10 parts by weight. In another example, the lower limit of the weight ratio of the optical absorbent with respect to 100 parts by weight of the resin component may be about 0.001 parts by weight, 0.005 parts by weight, 0.01 parts by weight, 0.05 parts by weight, 0.1 parts by weight, 0.5 parts by weight, 1 parts by weight, 1.1 parts by weight, 1.2 parts by weight, 1.3 parts by weight or 1.4 parts by weight and the upper limit thereof may be 10 parts by weight, 9 parts by weight, 8 parts by weight, 7 parts by weight, 6 parts by weight, 5 parts by weight, 4 parts by weight, 3 parts by weight, 2 parts by weight, or 1.5 parts by weight. The ratio may be within a range of more than or equal to any one of the lower limits described above and less than or equal to any one of the upper limits described above.

For example, the optical absorbent composition may further include a solvent in which the optical absorbent and/or the resin component are dispersed. There is no particular limitation for the type of solvent applied in this case, and a known solvent can be applied to form an optical absorption film, for example, a near-infrared absorption film. In the present invention, the optical absorbent component may exhibit appropriate compatibility or solubility as to various known solvents.

Examples of the solvent may include such as methylene chloride, cyclohexanone, toluene, methyl ethyl ketone, methyl isobutyl ketone, propylene glycol methyl ether acetate, diethylene glycol monoethyl ether 3-methoxy butanol, ethylene glycol monobutyl ether acetate, 4-hydroxy-4-methyl-2-pentanone, gamma butyrolactone, cyclohexanone, pyridone, chloroform, 1,4-dioxane, cyclohexanone, ortho-dichlorobenzene, chlorobenzene, aliphatic alcohol having two or more carbon numbers (e.g., isobutyl alcohol, isopropyl alcohol, ethanol, isopropanol, or butanol, etc.), butyl acetate, tetrahydrofuran, or xylene, but are not limited to.

When a solvent is applied, the ratio is not particularly limited, and the ratio may be adjusted within a range where the optical absorbent and/or resin component can be properly dispersed.

The optical absorbent composition may also include other necessary components in addition to the components described above. For example, an optical absorbent of a different type to the optical absorbent of Chemical Formula 1 may be included for the optical absorbent composition.

The present invention also relates to the application of the optical absorbent composition or the optical absorbent. For example, the present invention may relate an optical absorption film where the optical absorbent composition or the optical absorbent is applied. Such an optical absorption film may contain at least a resin component and the optical absorbent. In this case, the specific type of the resin component and the ratio between the resin component and the optical absorbent are the same as those descriptions for the optical absorbent composition.

The optical absorption film may be a film capable of absorbing light within a predetermined wavelength range. In one example, the optical absorption film may be an infrared absorption film or a near infrared absorption film. Such an optical absorption film may exhibit absorption characteristics in at least a part of a wavelength range of, for example, a range of about 600 nm to 950 nm.

For example, the optical absorption film may exhibit an absorption maximum within a wavelength range of 600 nm to 950 nm. In another example, the lower limit of the absorption maximum wavelength may be 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, or 790 nm. In addition, the upper limit of the absorption maximum wavelength may be 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, or 610 nm. The absorption maximum wavelength may be within a range of more than or equal to any one of the lower limits described above and less than or equal to any one of the upper limits described above.

Due to these characteristics, the optical absorption film can have excellent optical properties such as being able to prevent a shift phenomenon according to an incident angle when it is applied to devices such as various optical filters or infrared sensors, etc. and can have excellent physical properties such as heat resistance.

For example, the optical absorption film may have an absolute value of ΔA of 20% or less in Equation 1.

$$\Delta A=100\times(A_f-A_i)/A_i. \quad \text{[Equation 1]}$$

In Equation 1, $A_f$ is the transmittance at the absorption maximum wavelength of the optical absorption film maintained at 85° C. and 85% relative humidity for 120 hours, and $A_i$ is the transmittance at the absorption maximum wavelength of the above optical absorption film before being maintained at 85° C. and 85% relative humidity for 120 hours. In this case, the absorption maximum wavelength exists within a wavelength range of 600 nm to 950 nm.

In another example, the upper limit of the absolute value of ΔA in Equation 1 may be about 19%, 18%, 17%, 16%, 15%, 14%, 13%, 12%, 11%, 10%, 9%, 8%, or 7%, and the lower limit may be about 0%, 0.5%, 1%, 1.5%, 2%, 2.5%, 3%, 3.5%, 4%, 4.5%, 5%, 5.5%, 6%, 6.5%, 7%, 7.5%, or 8%. The absolute value of ΔA may be within a range of more than or equal to any one of the lower limits described above and less than or equal to any one of the upper limits described above.

In Equation 1, $A_f$ and $A_i$ may each be about 20% or less. In another example, in Equation 1, the upper limit of each of $A_f$ and $A_i$ may be about 19%, 18%, 17%, 16%, 15%, 14%, 13%, 12%, 11%, 10%, 9%, 8%, or 7%, the lower limit is 0%, 0.5%, 1%, 1.5%, 2%, 2.5%, 3%, 3.5%, 4%, 4.5%, 5%, 5.5%, 6%, 6.5%, 7%, 7.5% or 8%. Each of $A_f$ and $A_i$ may be within a range of more than or equal to any one of the lower limits described above and less than or equal to any one of the upper limits described above.

The optical absorption film may have an absolute value of Δλ of of 10% or less in Equation 2.

$$\Delta\lambda=100\times(\lambda_f-\lambda_i)/\lambda_i. \quad \text{[Equation 2]}$$

In Equation 2, $\lambda_f$ is the maximum absorption wavelength of the optical absorption film maintained at 85° C. and 85% relative humidity for 120 hours, and $\lambda_i$ is the absorption maximum wavelength of the optical absorption film before being maintained at 85° C. and 85% relative humidity for 120 hours. In this case, the absorption maximum wavelength exists within a wavelength range of 600 nm to 950 nm.

In another example, the upper limit of the absolute value of Δλ in Equation 2 may be about 10%, 9%, 8%, 7%, 6%, 5%, 4%, 3%, 2%, 1% or 0.5% and the lower limit can be about 0%, 0.5%, or 1%. The absolute value of Δλ may be within a range of more than or equal to any one of the lower limits described above and less than or equal to any one of the upper limits described above.

In Equation 2, $\lambda_f$ and $\lambda_i$ may be in the wavelength range of 600 nm to 950 nm, respectively. The lower limit of each of $\lambda_f$ and $\lambda_i$ may be, in another example, about 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, or 790 nm. In addition, the upper limit of each of $\lambda_f$ and $\lambda_i$ may be about 950 nm, 940 nm, 930 nm, 920 nm, 910 nm, 900 nm, 890 nm, 880 nm, 870 nm, 860 nm, 850 nm, 840 nm. 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, or 610 nm. Each of $\lambda_f$ and $\lambda_i$ may be within a range of more than or equal to any one of the lower limits described above and less than equal to any one of the upper limits described above.

Through the absorption characteristics, the optical absorption film can be applied to devices such as various optical filters or infrared sensors to efficiently achieve desired characteristics.

The optical absorption film in the present invention may be formed in a known manner as long as the optical absorbent composition or optical absorbent of the present invention is applied. For example, the optical absorption film may be formed by coating the optical absorbent composition in an appropriate manner and, if necessary, by performing a curing or drying process.

There is no particular limitation to the thickness of the optical absorption film, and the thickness may be adjusted in consideration of desired characteristics. In one example, the optical absorption film may have a thickness within a range of about 0.5 μm to about 20 μm.

The present invention also relates to an optical filter. The optical filter may include a substrate and the optical absorption film formed on one or both surfaces of the substrate.

FIG. 1 is a schematic showing an optical filter where the optical absorption film 200 is formed on one surface of a substrate 100.

The optical filter of the present invention may exhibit excellent performance by including the above-described optical absorption film. For example, the optical filter efficiently and accurately may block unnecessary infrared ray while implementing a visible light transmission band with high transmittance.

The type of transparent substrate applied to the optical filter is not particularly limited, and a known transparent substrate for an optical filter may be used. In one example, the substrate may be a so-called infrared absorbing substrate. The infrared absorbing substrate is a substrate that exhibits absorption characteristics in at least a part of the infrared region. A so-called blue glass, which contains copper and exhibits the above characteristics, is a representative example of the infrared absorbing substrate. Such an infrared absorbing substrate is useful in constructing an optical filter that blocks light in the infrared region, but is disadvantageous in obtaining high transmittance in the visible light region due to the absorption characteristics and also disadvantageous in terms of durability. In the present invention, by selecting an infrared absorbing substrate and combining it with the specific optical absorption film, it is possible to provide an optical filter that efficiently blocks desired light, exhibits high transmittance characteristics in the visible light region, and has excellent durability.

For the infrared absorbing substrate, a substrate exhibiting an average transmittance of 75% or more within a wavelength range of 425 nm to 560 nm may be used. In another example, the average transmittance may be within the range of about 77% or more, 79% or more, 81% or more, 83% or more, 85% or more, 87% or more, or 89% or more and/or about 98% or less, 96% or less, 94% or less, 92% or less, or 90% or less.

For the infrared absorbing substrate, a substrate exhibiting a maximum transmittance of 80% or more within a wavelength range of 425 nm to 560 nm may be used. In another example, the maximum transmittance may be within the range of about 82% or more, 84% or more, 86% or more, 88% or more, or 90% or more and/or about 100% or less, 98% or less, 96% or less, 94% or less, 92% or less, or 90% or less.

For the infrared absorbing substrate, a substrate exhibiting an average transmittance of 75% or more within a wavelength range of 350 nm to 390 nm may be used. In another example, the average transmittance may be within the range of about 77% or more, 79% or more, 81% or more, or 83% or more and/or about 98% or less, 96% or less, 94% or less, 92% or less, 90% or less, 88% or less, 86% or less, or 84% or less.

For the infrared absorbing substrate, a substrate exhibiting a maximum transmittance of 80% or more within a wavelength range of 350 nm to 390 nm may be used. In another example, the maximum transmittance may be within the range of about 82% or more, 84% or more, 86% or more, or 87% or more and/or about 100% or less, 98% or less, 96% or less, 94% or less, 92% or less, 90% or less, or 88% or less.

For the infrared absorbing substrate, a substrate having a transmittance at a wavelength of 700 nm within a range of 10% to 45% may be used. In another example, the transmittance may be about 43% or less, 41% or less, 39% or less, 37% or less, 35% or less, 33% or less, 31% or less, or 29% or less or about 12% or more, 14% or more, 16% or more, 18% or more, 20% or more, 22% or more, 24% or more, 26% or more, or 28% or more.

For the infrared absorbing substrate, a substrate exhibiting an average transmittance within a range of 5% to 30% within a wavelength range of 700 nm to 800 nm may be used. In another example, the average transmittance may be within the range of about 7% or more, 9% or more, 11% or more, 13% or more, 15% or more, 15.5% or more, 16% or more, or 16.5% or more, and/or about 28% or less, 26% or less, 24% or less, 22% or less, 20% or less, 18% or less, or 17% or less.

For the infrared absorbing substrate, a substrate exhibiting a maximum transmittance within a range of 10% to 45% within a wavelength range of 700 nm to 800 nm may be used. In another example, the maximum transmittance may be within the range of about 12% or more, 14% or more, 16% or more, 18% or more, 20% or more, 22% or more, 24% or more, 26% or more, or 28% or more and/or 43% or less, 41% or less, 39% or less, 37% or less, 35% or less, 33% or less, 31% or less, or 29% or less.

For the infrared absorbing substrate, a substrate exhibiting an average transmittance within a range of 3% to 20% within a wavelength range of 800 nm to 1,000 nm may be used. In another example, the average transmittance may be further adjusted within the range of about 5% or more, 7% or more, 9% or more, or 11% or more and/or about 18% or less, 16% or less, 14% or less, or 12% or less.

For the infrared absorbing substrate, a substrate exhibiting maximum transmittance within a range of 5% to 30% within a wavelength range of 800 nm to 1,000 nm may be used. In another example, the maximum transmittance may be within the range of about 7% or more, 9% or more, 11% or more, 13% or more, or 15% or more and/or about 28% or less, 26% or less, 24% or less, 22% or less, 20% or less, 18% or less, or 16% or less.

For the infrared absorbing substrate, a substrate exhibiting an average transmittance within a range of 10% to 50% within a wavelength range of 1,000 nm to 1,200 nm may be used. In another example, the average transmittance may be further adjusted within the range of about 12% or more, 14% or more, 16% or more, 18% or more, 20% or more, 22% or more, 24% or more, or 25% or more and/or about 48% or less, 46% or less, 44% or less, 42% or less, 40% or less, 38% or less, 36% or less, 34% or less, 32% or less, 30% or less, 28% or less, or 26% or less.

The infrared absorbing substrate may have a transmission band exhibiting maximum transmittance within a range of 10% to 70% within a wavelength range of 1,000 nm to 1,200 nm. In another example, the maximum transmittance may be within the range of about 12% or more, 14% or more, 16% or more, 18% or more, 20% or more, 22% or more, 24% or more, 26% or more, 28% or more, 30% or more, 32% or more, 34% or more, or 36% or more and/or about 68% or less, 66% or less, 64% or less, 62% or less, 60% or less, 58% or less, 56% or less, 54% or less, 52% or less, 50% or less, 48% or less, 46% or less, 44% or less, 42% or less, 40% or less, 38% or less, or 37% or less.

The infrared absorbing substrate may be combined with the optical absorption film of the present invention to form a desired optical filter. As such a substrate, a substrate known as a so-called infrared absorbing glass can be used. Such glass is an absorption-type glass manufactured by adding CuO or the like to a fluorophosphate-based glass or a phosphate-based glass. Therefore, in one example in the present invention, for the infrared absorbing substrate, a CuO-containing fluorophosphate glass substrate or a CuO-containing phosphate glass substrate may be used. The phosphate glass includes a silicophosphate glass where a part of the frame of the glass is composed of $SiO_2$. Such absorption-type glass is known, and for example, a glass disclosed in Korean Patent Registration No. 10-2056613 or other commercially available absorption-type glass (e.g., commercially available products made by such as Hoya Co., Schott Co., or PTOT Co.) may be used.

This infrared absorbing substrate contains copper. In the present invention, a substrate where the copper content is in the range of 1 wt % to 7 wt % may be used. In another example, the copper content may be about 1.5 wt % or more, 2 wt % or more, 2.5 wt % or more, 2.6 wt % or more, 2.7 wt % or more, or 2.8 wt % or more or about 6.5 wt % or less, 6 wt % or less, 5.5 wt % or less, 5 wt % or less, 4.5 wt % or less, 4 wt % or less, 3.5 wt % or less, 3 wt % or less, or 2.9 wt % or less. A substrate having such a copper content tends to exhibit the above-mentioned optical properties and it can form an optical filter having desired properties in combination with the above optical absorption film.

The copper content can be confirmed by using an X-ray fluorescence analysis equipment (WD XRF, Wavelength Dispersive X-Ray Fluorescence Spectrometry). When X-rays are irradiated on a specimen (a substrate) using the equipment, characteristic secondary X-rays are generated from individual elements of the specimen and the equipment detects the secondary X-rays according to the wavelength of each element. The intensity of the secondary X-rays is proportional to the element content, and therefore, quantitative analysis can be performed through the intensity of the secondary X-rays measured according to the wavelength of each element.

The thickness of the infrared absorbing substrate may be adjusted within a range of, for example, about 0.03 mm to about 5 mm, but is not limited to.

The optical filter of the present invention may include other known components required in addition to the substrate and the optical absorption film. For example, the optical filter may further include a dielectric film. The dielectric film, for example, may further include the dielectric film on one side or both sides of the substrate.

Figure 2:
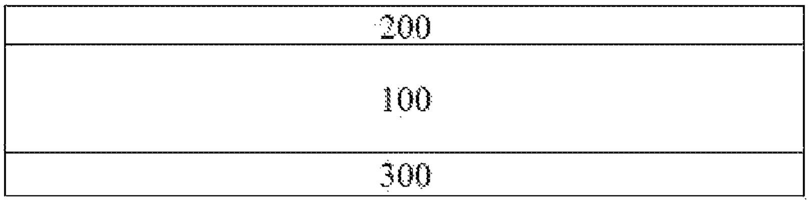
Figure 3:
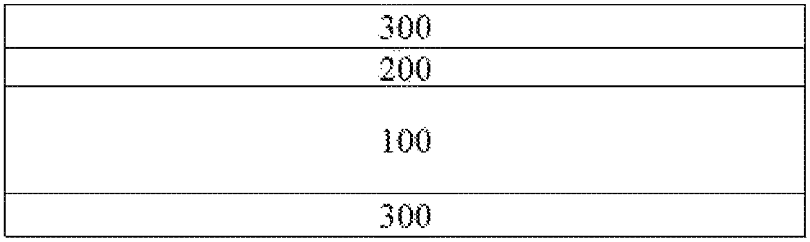

FIGS. 2 and 3 disclose examples of an optical filter to which a dielectric film 300 is added. The schematics disclose an example where the dielectric film 300 is formed on one or both sides of a stacked structure including a substrate 100 and an optical absorption film 200.

This dielectric film is a film formed by repeatedly stacking a dielectric material with a low refractive index and a dielectric material with a high refractive index and is used to form a so-called IR reflective layer and an anti-reflection (AR) layer. In the present invention, a dielectric film for forming such a known IR reflective layer or an AR layer may be applied.

Consequently, the dielectric film may be a multilayer structure including at least two sublayers of each having a different refractive index and may include a multilayer structure where the two sublayers are repeatedly stacked.

The type of material forming the dielectric film, that is, the material forming each of the sub-layers, is not particularly limited, and known material may be applied. In general, $SiO_2$ or fluorides such as $Na_5Al_3Fl_4$, $Na_3AlF_6$ or $MgF_2$ may be used to manufacture the low refractive index sublayer, and amorphous silicon, $TiO_2$, $Ta_2O_5$, $Nb_2O_5$, ZnS or ZnSe, etc. may be used to manufacture the high refractive index sublayer, but material applied in the present invention is not limited to.

A method of forming the dielectric film as described above is not particularly limited and the dielectric film may be formed, for example, by applying a known deposition method. In the industry, a method for controlling reflection or transmission characteristics of a corresponding dielectric film in consideration of the deposition thickness or number of layers of a sublayer is known, and in the present invention, the dielectric film may be formed according to such a known method.

In one example, in the dielectric film included in the optical filter of the present invention, the shortest wavelength exhibiting a reflectance of 50% within a wavelength range of 600 nm to 900 nm may be about 710 nm or more, or such wavelength may not exist. In addition, the maximum reflectance of the dielectric film is less than 50% in the wavelength range of 600 nm to 900 nm when the above wavelength does not exist. The shortest wavelength exhibiting the 50% reflectance, if present, in another example, may be about 715 nm or more, 720 nm or more, 725 nm or more, 730 nm or more, 735 nm or more, 740 nm or more, 745 nm or more, 750 nm or more, or 754 nm or more or about 900 nm or less, 850 nm or less, 800 nm or less, 790 nm or less, 780 nm or less, 770 nm or less, or 760 nm or less. The shortest wavelength exhibiting a reflectance of 50% may be within a range between a lower limit of any of the lower limits described above and an upper limit, and in this case, the upper limit may be 900 nm.

As described above, by controlling the reflection characteristics of the dielectric film, so-called petal flare phenomenon can be prevented. The petal flare phenomenon refers to a phenomenon where red lines, which are not observed with the naked eye, are shown in a picture when photographing a luminous body. It is called as a petal flare because the red lines are often shaped like petals on the luminous body. As the sensitivity of the sensor included in the image capturing device increases and the transmittance of the optical filter is increased to obtain a clearer picture, the frequency of the occurrence of the petal flare phenomenon is increasing.

One of the causation of the petal flare phenomenon may be that reflection of near-infrared ray is repeated within an image capturing device equipped with an optical filter. Since a so-called IR film among dielectric films formed in a conventional optical filter is formed to block light in the near-infrared region by reflection, the shortest wavelength at which the dielectric film exhibits a reflectance of 50% is formed near visible light which is usually less than 710 nm. However, reflection of near-infrared ray is accelerated in the image capturing device by such a dielectric film, and thus the petal flare phenomenon occurs.

However, infrared ray can be effectively blocked even when the shortest wavelength at which the dielectric film exhibits a reflectance of 50% is adjusted to 710 nm or more through the optical absorption film in the present invention, and the petal flare can also be prevented. A design method itself for controlling the reflection characteristics of a dielectric film is known.

The optical filter may further include an optical absorption film (referred to as an ultraviolet absorption film) exhibiting ultraviolet absorbing characteristics as an optical absorption film distinct from the optical absorption film. However, such an optical absorption film is not an essential component, and for example, an ultraviolet absorbent described later may be incorporated into one optical absorption film together with the optical absorbent of Chemical Formula 1.

In one example, the UV absorption film may be designed to exhibit an absorption maximum in a wavelength range of about 300 nm to 390 nm.

The UV absorption film may include only an UV absorbent and it may include two or more kinds of UV absorbents if necessary. For example, as the ultraviolet absorbent, a known absorbent exhibiting an absorption maximum in a wavelength range of about 300 nm to 390 nm can be applied, and examples thereof include ABS 407 manufactured by Exiton; UV381A, UV381B, UV382A, UV386A, VIS404A from QCR Solutions Co.; ADA1225, ADA3209, ADA3216, ADA3217, ADA3218, ADA3230, ADA5205, ADA3217, ADA2055, ADA6798, ADA3102, ADA3204, ADA3210, ADA2041, ADA3201, ADA3202, ADA3215, ADA3219, ADA3225, ADA3232, ADA4160, ADA5278, ADA5762, ADA6826, ADA7226, ADA4634, ADA3213, ADA3227, ADA5922, ADA5950, ADA6752, ADA7130, ADA8212, ADA2984, ADA2999, ADA3220, ADA3228, ADA3235, ADA3240, ADA3211, ADA3221, ADA5220, ADA7158 from HW Sands Co.; and DLS 381B, DLS 381C, DLS 382A, DLS 386A, DLS 404A, DLS 405A, DLS 405C, DLS 403A from CRYSTALYN Co., but are not limited to.

Material and construction methods constituting the ultraviolet absorption film are not particularly limited and known material and construction methods may be applied.

Usually, an UV absorption film is formed by using material in which an UV absorbent capable of exhibiting a desired absorption maximum and a transparent resin are blended. In this case, a resin component applied to the optical absorbent composition may be applied as the transparent resin.

In addition to the above-described layers, necessary various layers may be added to the optical filter within a scope that does not impair the desired effect.

The present invention also relates to an image capturing device including the optical filter. At this time, a configuration method of the image capturing device or an application method of the optical filter is not particularly limited, and known configuration and application methods may be applied.

In addition, the application of the optical filter of the present invention is not limited to the image capturing device and it can be applied to various other applications requiring near-infrared ray cut (e.g., a display device such as a PDP).

The present invention also relates to an infrared sensor including the optical absorption film. The configuration of the infrared sensor is not particularly limited as long as the optical absorption film of the present invention is included. For example, a known motion sensor, a proximity sensor, or a gesture sensor may be configured by introducing the optical absorption film of the present invention.

In addition, the application of an optical absorbent composition or an optical absorption film in the present invention is not limited to the optical filter, the infrared sensor, and/or the image capturing device. The optical absorbent composition or the optical absorption film can be applied to various other applications requiring infrared ray cut (e.g., a display device such as a PDP).

An optical filter of the present invention will be specifically described through the following embodiments, but the scope of the optical filter of the present invention is not limited by the following embodiments.

1. Measuring Absorption Maximum

The absorption maximum was evaluated by a conventional method. Specifically, the sample was dissolved in a chloroform solvent at a concentration of about $10^{-5}$ M and then evaluated by using a measuring instrument (Agilent, Varian Cary 4000).

2. Evaluation of Transmittance Spectrum

The transmittance spectrum was measured by using a spectrophotometer (Manufacturer: Perkinelmer Co., Product Name: Lambda 750 Spectrophotometer) for a specimen obtained by cutting the measurement subject (e.g., an optical absorption film) to 10 mm and 10 mm in width and length, respectively. The transmittance spectrum was measured for each wavelength and incident angle according to the manual of the equipment. The specimen was placed on a straight line between the measuring beam and the detector of the spectrophotometer, and the transmittance spectrum was checked while changing the incident angle of the measuring beam from 0° to 40°. Unless specifically stated otherwise, the result of the transmittance spectrum in this embodiment was the result when the incident angle is 0°. The incident angle of 0° is a direction substantially parallel to the direction normal to the surface of the specimen.

The average transmittance within a predetermined wavelength region in the transmittance spectrum was the result of measuring the transmittance of each wavelength while increasing the wavelength by 1 nm from the shortest wavelength in the wavelength region, and then calculating the arithmetic average of the measured transmittance. The maximum transmittance is the maximum one among the transmittance measured while increasing the wavelength by 1 nm. For example, the average transmittance within the wavelength range of 350 nm to 360 nm is the arithmetic average of transmittances measured at wavelengths of 350 nm, 351 nm, 352 nm, 353 nm, 354 nm, 355 nm, 356 nm, 357 nm, 358 nm, 359 nm and 360 nm and the maximum transmittance within the wavelength range of 350 nm to 360 nm is the highest transmittance among transmittances measured at wavelengths of 350 nm, 351 nm, 352 nm, 353 nm, 354 nm, 355 nm, 356 nm, 357 nm, 358 nm, 359 nm and 360 nm.

3. Measuring Solubility

The solubility of the optical absorbent was evaluated. Solubility was determined according to the following criteria by evaluating the solubility of the optical absorbent in the solvent (MC, Methylene Chloride) at room temperature (about 25° C.).

<Solubility Criteria>

A: When the solubility is 1% by mass or more.

B: When the solubility is 0.5% by mass or more and less than 1% by mass.

C: When the solubility is 0.2% by mass or more and less than 0.5% by mass.

D: When the solubility is less than 0.2% by mass.

4. Pyrolysis Temperature (Td 5%) Analysis

Thermogravimetric analysis (TGA) was performed by using TGA N-1000 equipment manufactured by Scinco Co. The analysis was performed by using about 3 mg of the sample (optical absorbent) and the analysis was conducted at a temperature range of 25° C. to 800° C., with a temperature increase rate of 10° C./min, and under 60 $cm^3$/min of a nitrogen ($N_2$) atmosphere. As for the Td pyrolysis temperature, the value(Td 5%) at 95% weight loss was used.

5. Mass Analysis (MALDI TOF)

Mass analysis of the synthesized chemical compound was performed with MALDI TOF Voyager DE-STR equipment (Applied Biosystems, USA), measured from Reflector mode to Positive mode, and analyzed by using Dithranol matrix.

Embodiment 1

Preparation of Chemical Compound (A1)

A chemical compound of Chemical Formula A1 was synthesized according to Chemical Reaction Formula 1.

[Chemical Reaction Formula 1]

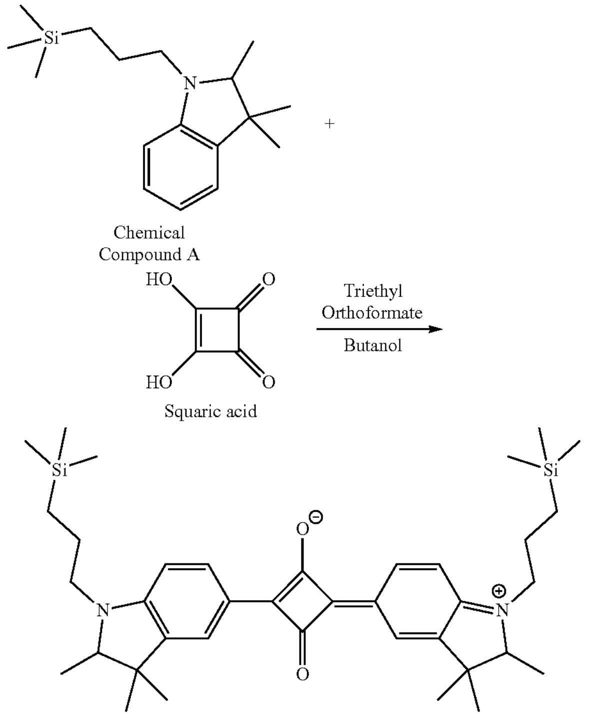

Molecular Weight: 629.03
Chemical Formula A1

1.5 g (0.0054 mol) of chemical compound A in Chemical Reaction Formula 1, 0.4 g (0.0027 mol) of squaric acid and 1.5 g of triethyl orthoformate (Triethyl Orthoformate) was dissolved in 15 mL of n-butanol and reacted at 95° C. for 4 hours. After the reaction, the reaction was cooled to room temperature (about 25° C.) and the precipitate was obtained from adding 300 mL of ethanol and stirring for 6 hours or more. The obtained precipitate was filtered under reduced pressure while passing ethanol to obtain the desired chemical compound (Chemical Formula A1) (0.7 g, 40%) (MALDI-TOF m/z 629.52 $[M+H]^+$).

Figure 4:
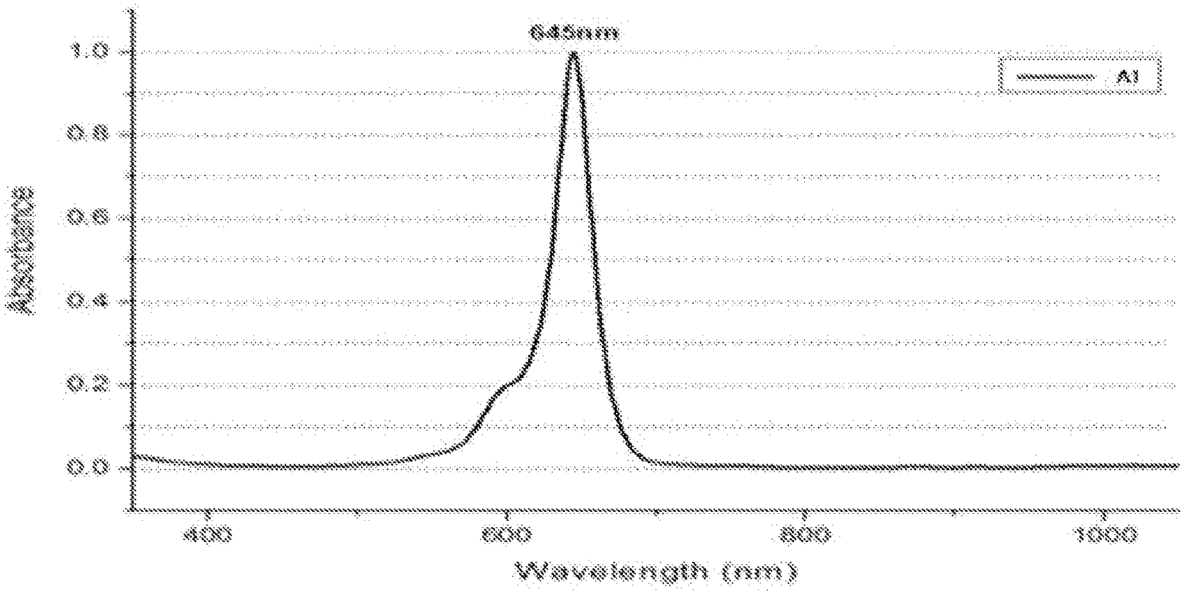
FIGS. 4 to 6 are light absorbance spectra of optical absorbents prepared in Embodiments or Comparative Example.

FIG. 4 is an absorbance spectrum of the chemical compound of Chemical Formula A1. It can be seen from FIG. 4 that the chemical compound of Chemical Formula A1 has an absorption maximum wavelength of about 652 nm.

Embodiment 2

Preparation of Chemical Compound (A2)

A chemical compound of Chemical Formula A2 was synthesized according to Chemical Reaction Formula 2.

[Chemical Reaction Formula 2]

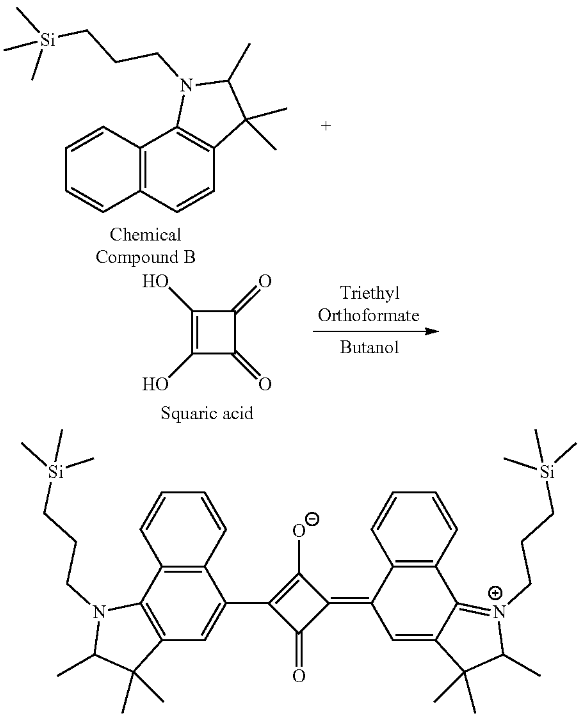

Chemical Compound B

Squaric acid

Molecular Weight: 729.15
Chemical Formula A2

2.5 g (0.0076 mol) of chemical compound B in Chemical Reaction Formula 2, 0.43 g (0.0038 mol) of squaric acid and 2.5 g of triethyl orthoformate (Triethyl Orthoformate) was dissolved in 25 mL of n-butanol and reacted at 95° C. for 4 hours. After the reaction, the reaction was cooled to room temperature (about 25° C.) and the precipitate was obtained from adding 300 mL of ethanol and stirring for 6 hours or more. The obtained precipitate was filtered under reduced pressure while passing ethanol to obtain the desired chemical compound (Chemical Formula A2) (1.3 g, 47.6%) (MALDI-TOF m/z 729.8 $[M+H]^+$).

Figure 5:
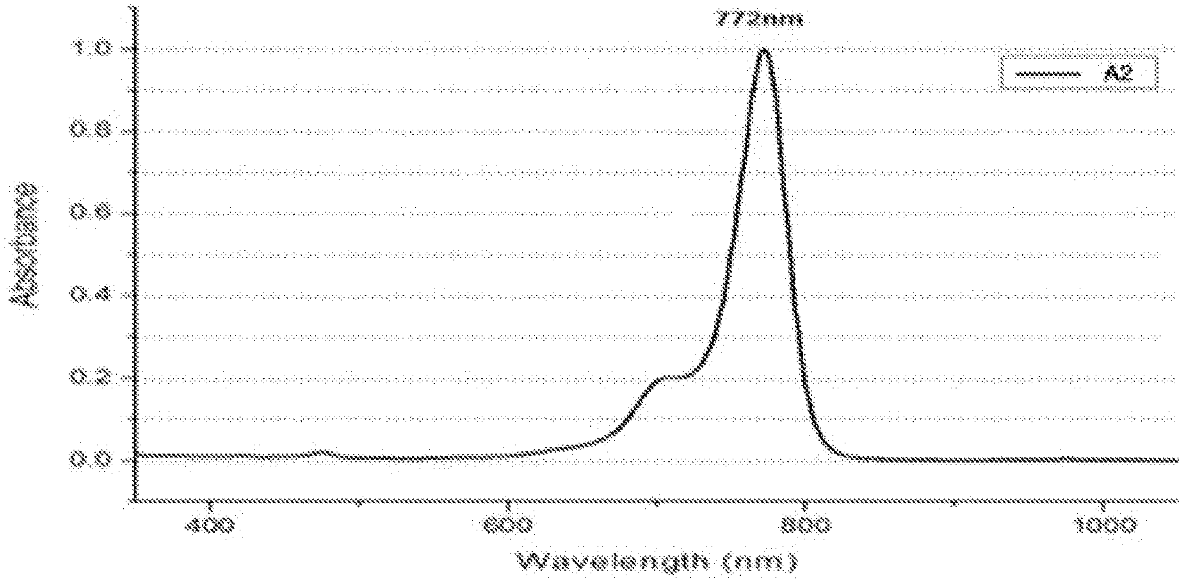

FIG. 5 is an absorbance spectrum of the chemical compound of Chemical Formula A2. It can be seen from FIG. 5 that the chemical compound of Chemical Formula A2 has an absorption maximum wavelength of about 772 nm.

Comparative Example 1

Preparation of Chemical Compound (A3)

A chemical compound of Chemical Formula A3 was synthesized according to Chemical Reaction Formula 3.

[Chemical Reaction Formula 3]

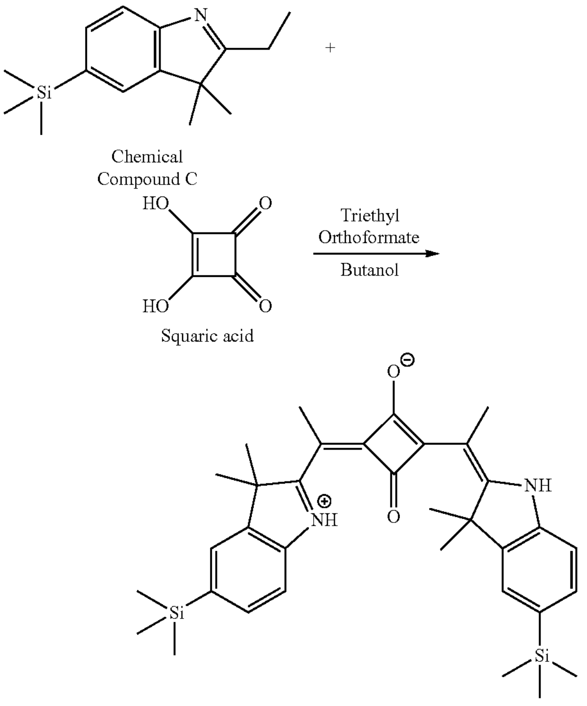

Chemical Compound C

Squaric acid

Molecular Weight: 568.90
Chemical Formula A3

3.9 g (0.015 mol) of chemical compound C in Chemical Reaction Formula 3, 0.9 g (0.0079 mol) of squaric acid and 2 g of triethyl orthoformate (Triethyl Orthoformate) was dissolved in 30 mL of n-butanol and reacted at 95° C. for 4 hours. After the reaction, the reaction was cooled to room temperature (about 25° C.) and the precipitate was obtained from adding 300 mL of ethanol and stirring for 6 hours or more. The obtained precipitate was filtered under reduced pressure while passing ethanol to obtain the desired chemical compound (Chemical Formula A3) (1.2 g, 27.2%) (MALDI-TOF m/z 568.90 $[M+H]^+$).

Figure 6:
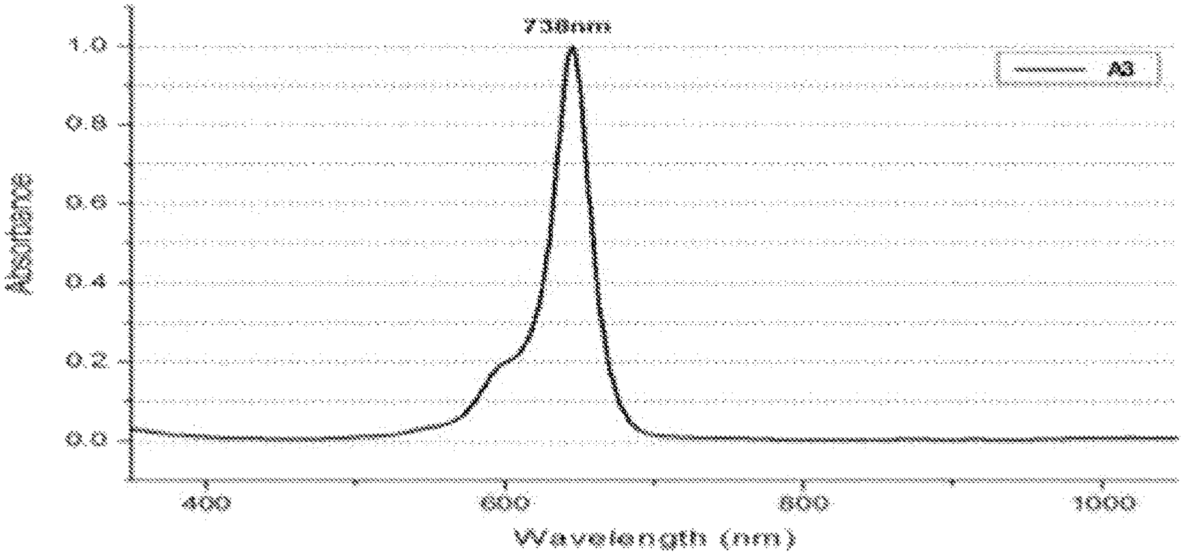

FIG. 6 is an absorbance spectrum of the chemical compound of Chemical Formula A3. It can be seen from FIG. 6 that the chemical compound of Chemical Formula A3 has an absorption maximum wavelength of about 738 nm.

Table 1 below shows the results of summarizing the characteristics of the optical absorbents of Embodiments 1 and 2 and Comparative Example 1. In Table 1, Td 5% means a 5% pyrolysis temperature.

TABLE 1

| | Absorption Maximum Wavelength (nm) | Td 5% (° C.) | Solubility |
|---|---|---|---|
| Embodiment 1 | 652 | 247 | A |
| Embodiment 2 | 772 | 260 | A |
| Comparative Example 1 | 738 | 187 | A |

Test Example 1

A coating solution was prepared by mixing a silicone resin (Dow Chemical, RSN-0217) as a resin component, an optical absorbent, and a solvent (Cyclohexanone). The mixing ratio of the resin component, the optical absorbent and the solvent was 69.3:0.99:29.7 in weight ratio (Resin:Optical Absorbent:Solvent).

The coating solution was coated on a transparent substrate (a glass substrate manufactured by SCHOTT Co.) and maintained at 140° C. for about 2 hours to form an optical absorption film having a thickness of about 6 μm. The optical absorbent of Embodiment 1, Embodiment 2 or Comparative Example 1 was used as the optical absorbent.

Table 2 below summarizes the transmittance of the optical absorption film before and after reliability evaluation in the ultraviolet and the near infrared regions. The reliability evaluation is an evaluation of the optical absorption film maintained at 85° C. and 85% relative humidity for 120 hours. In Table 2, B means the result before performing the reliability evaluation, and A means the result after performing the reliability evaluation. In addition, in Table 2, Λmax means the transmittance at the absorption maximum.

In Table 2, Δ is the change rate (%) of each characteristic before and after the reliability evaluation and it is a result calculated as 100×(A−B)/B, where A is a numerical value indicated under column A in Table 2, and B is a numerical value indicated under column B in Table 2. In Table 2, $T_{max}$ denotes the highest transmittance within a corresponding wavelength range, $T_{ave}$ denotes an average transmittance within a corresponding wavelength range, and $T_{min}$ denotes a minimum transmittance within a corresponding wavelength range.

TABLE 2

| | | Embodiment 1 | | | Embodiment 2 | | | Comparative Example 1 | | |
|---|---|---|---|---|---|---|---|---|---|---|
| | | B | A | Δ | B | A | Δ | B | A | Δ |
| 425~465 | $T_{min}$ | 89.64 | 89.42 | −0.2 | 88.75 | 88.52 | −0.3 | 91.35 | 91.62 | 0.3 |
| nm | $T_{ave}$ | 90.49 | 90.26 | −0.3 | 89.87 | 89.72 | −0.2 | 91.99 | 92.03 | 0 |
| 466~480 | $T_{min}$ | 89.06 | 89.10 | 0 | 87.88 | 87.95 | 0.1 | 91.84 | 91.76 | −0.1 |
| nm | $T_{ave}$ | 89.64 | 89.58 | −0.1 | 88.61 | 88.64 | 0 | 92.14 | 92.07 | −0.1 |
| 480~560 nm | $T_{ave}$ | 91.17 | 91.06 | −0.1 | 90.93 | 90.86 | −0.1 | 92.32 | 92.27 | −0.1 |
| Λmax | $T_{max}$ | 6.12 | 6.62 | 8.2 | 8.91 | 9.53 | 7 | 66.25 | 89.21 | 34.7 |

Test Example 2

Figure 7:
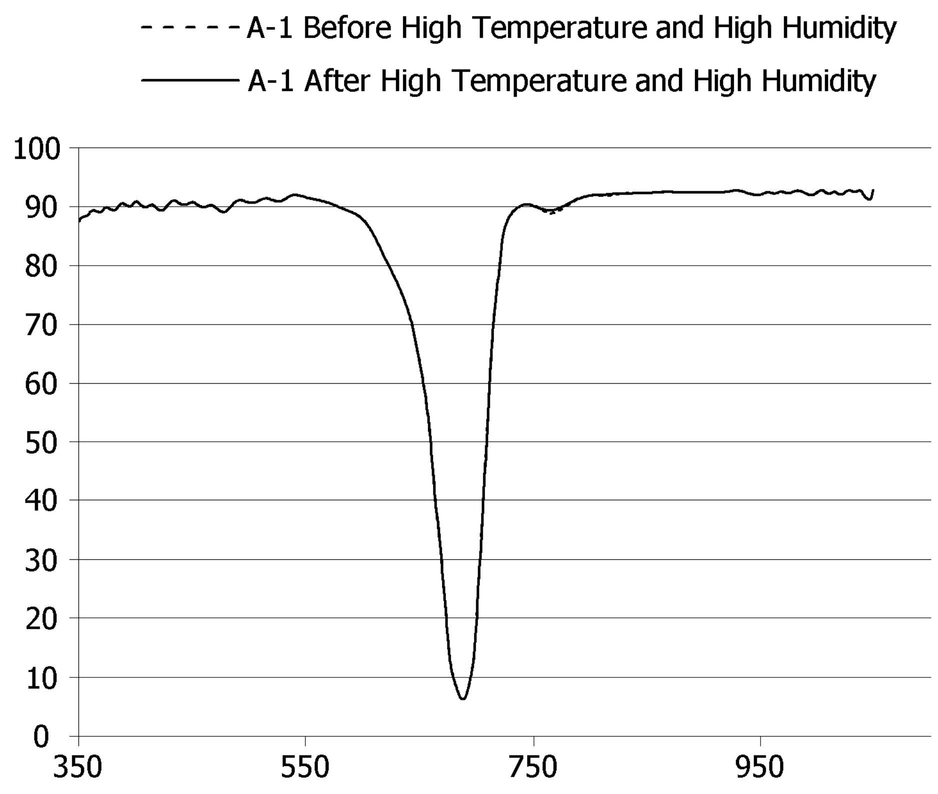
FIGS. 7 to 9 are spectra showing light absorption characteristics from the evaluation of optical absorption films including the optical absorbents prepared in Embodiments or Comparative Examples before and after maintained under high-temperature and high-humidity condition.
Figure 8:
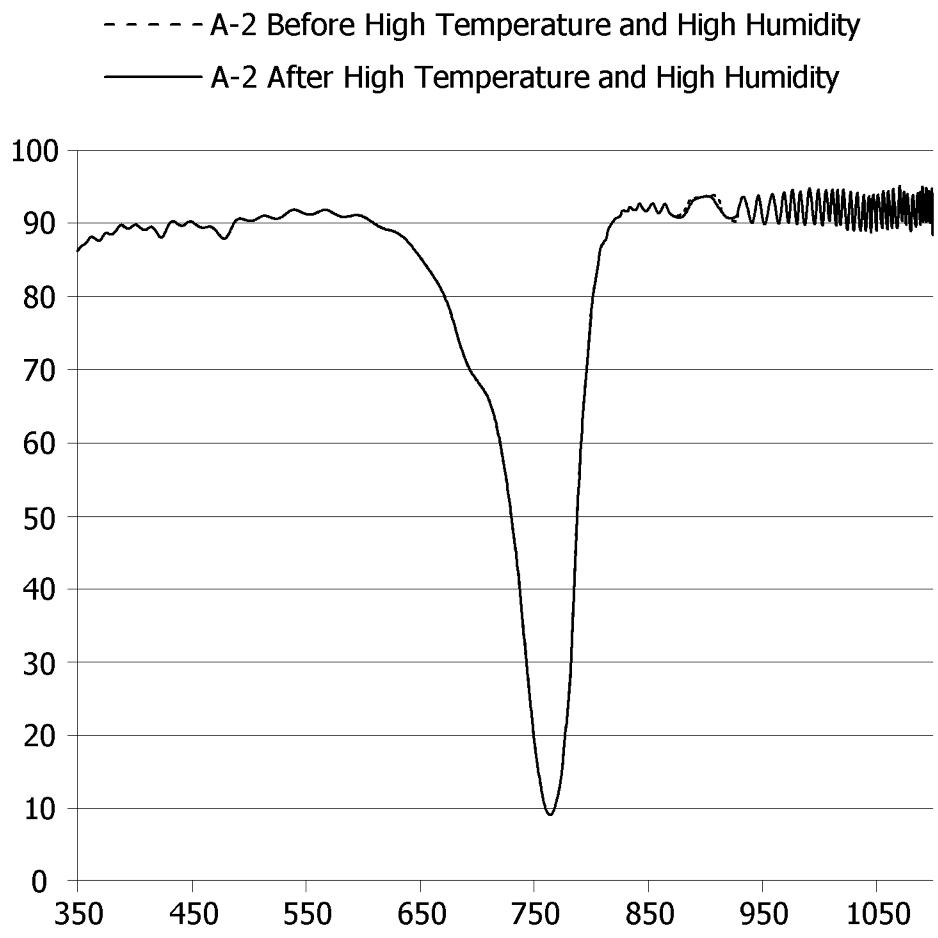
Figure 9:
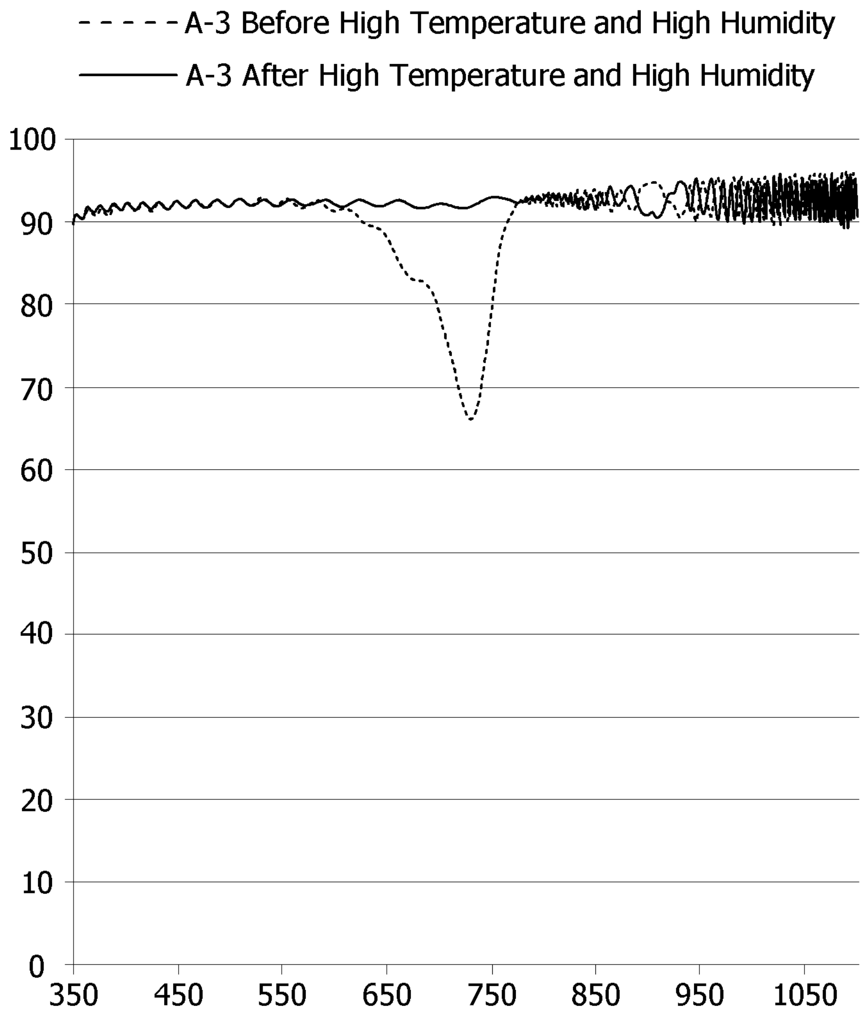

For the optical absorption film prepared in Test Example 1, the absorbance spectrum of the optical absorption film prepared by using the optical absorbent of Embodiment 1 is shown in FIG. 7, the absorbance spectrum of the optical absorption film prepared by using the optical absorbent of Embodiment 2 is shown in FIG. 8, and the absorbance spectrum of the optical absorption film prepared by using the optical absorbent of Comparative Example 1 is shown in FIG. 9. In FIGS. 7 to 9, A-1, A-2, and A-3 indicate evaluations of the optical absorption films of Embodiments 1 and 2 and Comparative Example 1, respectively. The result indicated as "before high temperature and high humidity" indicates that the result immediately after the optical absorption film was prepared. The result indicated as "after high temperature and high humidity" indicates that the result after performing the high temperature and high humidity evaluation on the optical absorption film. The high-temperature and high-humidity evaluation is an evaluation where the optical absorption film is maintained at a temperature of 85° C. and under a relative humidity of 85% for 120 hours.

From the comparison of FIGS. 7 to 9, it can be seen that the optical absorption film using the optical absorbent of Embodiments maintains the same light absorption characteristics before and after high temperature and high humidity with almost no change, whereas in the case of applying the optical absorbent of Comparative Example, the light absorption property is almost lost after being maintained under the high temperature and high humidity condition.

The main contents of FIGS. 7 to 9 are summarized in Table 3. In Table 3, $A_f$ is the transmittance at the absorption maximum wavelength of the optical absorption film maintained at 85° C. temperature and under 85% relative humidity for 120 hours, $\lambda_f$ is the absorption maximum wavelength at this time, and $A_i$ is the transmittance at the absorption maximum wavelength of the optical absorption film before being maintained at 85° C. temperature and under 85% relative humidity for 120 hours. $\lambda_i$ is the absorption maximum wavelength at this time.

In Table 3, ΔA is a value calculated as $100\times(A_f-A_i)/A_i$ and Δλ is a value calculated as $100\times(\lambda_f-\lambda_i)/\lambda_i$.

TABLE 3

| | Example 1 | Example 2 | Comparative Example 1 |
|---|---|---|---|
| $A_i$ | 6.12% | 8.91% | 66.3% |
| $A_f$ | 6.62% | 9.52% | 90.6% |
| ΔA | 8.2% | 6.8% | 36.7% |
| $\lambda_i$ | 658 nm | 765 nm | 731 nm |
| $\lambda_f$ | 658 nm | 765 nm | 909 nm |
| Δλ | 0% | 0% | 24.4% |

Comparing the results of FIGS. 4 to 6 with the results of FIGS. 7 to 9 and Table 3, the optical absorbents of Embodiments and Comparative Example have similar spectral characteristics of the optical absorbents themselves, but it can be seen that there is large difference in absorption characteristics among themselves when the optical absorbents were applied to optical absorption films and after high-temperature and high-humidity evaluation was performed. From these findings, it can be confirmed that the optical absorbent of the present invention has excellent compatibility with the resin component forming the optical absorption film due to its unique structure and excellent heat resistance. Thus, the optical absorbent can effectively form an optical absorption film with excellent performance.

The invention claimed is:

1. An optical absorbent represented by Chemical Formula 1:

[Chemical Formula 1]

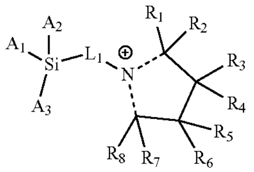

wherein $A_1$ to $A_3$ are each independently hydrogen, halogen, an alkyl group, an alkenyl group, an alkynyl group, an alkoxy group, an aryl group, or an arylalkyl group;

$L_1$ is $-U_1-T_1-U_2-T_2$ $U_3-$ where $T_1$ and $T_2$ are each independently an oxygen atom or absent and $U_1$ to $U_3$ are each independently an alkylene group, an alkylidene group, an alkenylene group, an alkynylene group, or absent;

$R_1$ and $R_2$, $R_1$ to $R_6$, $R_3$ to $R_6$, or $R_5$ to $R_8$ in $R_1$ to $R_8$ form an absorption edge and substituents which do not form the absorption edge among $R_1$ to $R_8$ are each independently hydrogen, halogen, a hydroxyl group, a cyano group, a nitro group, a carboxyl group, an alkyl group, an alkoxy group, an aryl group, an arylalkyl group, an alkylcarbonylamino group, an arylalkylcarbonylamino group, a haloalkylsulfonylamino group, an alkylsulfonylamino group, an arylalkylsulfonylamino group, or an amino group; and two dotted lines in Chemical Formula 1 represent as either a single bond or a double bond, wherein each one of the two dotted lines represents as the single bond and the double bond, respectively, or both the two dotted lines represent as the single bond and a cation symbol in Chemical Formula 1 is absent upon both the dotted lines representing as the single bond.

2. The optical absorbent of claim 1, wherein an absorption maximum is exhibited within a wavelength range of 600 nm to 950 nm.

3. The optical absorbent of claim 1, wherein a molar mass is in a range of 400 g/mol to 2,000 g/mol.

4. The optical absorbent of claim 1, wherein a 5% pyrolysis temperature is 150° C. or higher.

5. The optical absorbent of claim 1, wherein $A_1$ to $A_3$ in Chemical Formula 1 are each independently an alkyl group, an alkynyl group, an alkenyl group, or an alkoxy group.

6. The optical absorbent of claim 5, wherein any one of Conditions 1 to 3 are satisfied:

Condition 1: $T_1$, $T_2$, $U_1$ and $U_3$ are absent, and $U_2$ is an alkylene group, an alkylidene group, an alkenylene group, or an alkynylene group in Chemical Formula 1;

Condition 2: $U_1$ and $U_3$ are absent, one of $T_1$ and $T_2$ is oxygen, and the other is absent, and $U_2$ is an alkylene group, an alkylidene group, an alkenylene group, or an alkynylene group in Chemical Formula 1; and Condition 3: $U_3$ and $T_2$ are absent, $T_1$ is an oxygen atom, and $U_1$ and $U_2$ are each independently an alkylene group, an alkylidene group, an alkenylene group, or an alkynylene group.

7. The optical absorbent of claim 1, wherein the substituents that do not form the absorption edge in $R_1$ to $R_8$ are each independently hydrogen, halogen, a hydroxyl group, a cyano group, a nitro group, a carboxyl group, an alkyl group, alkoxy group, an alkylsulfonylamino group, or an amino group.

8. The optical absorbent of claim 1, wherein the optical absorbent is a squarylium-based chemical compound.

9. The optical absorbent of claim 1, wherein the optical absorbent is represented by Chemical Formula 2:

[Chemical Formula 2]

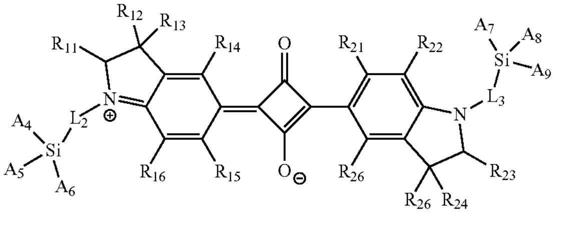

wherein $A_4$ to $A_9$ are each independently hydrogen, halogen, an alkyl group, an alkenyl group, an alkoxy group, an aryl group, or an arylalkyl group;

$L_2$ and $L_3$ are each independently the same as $L_1$ in Chemical Formula 1; and $R_{11}$ to $R_{16}$ and $R_{21}$ to $R_{26}$ are each independently hydrogen, halogen, a hydroxyl group, a cyano group, a nitro group, a carboxyl group, an alkyl group, an alkoxy group, an aryl group, an arylalkyl group, an amino group, an alkylcarbonylamino group, an arylalkylcarbonylamino group, a haloalkylsulfonylamino group, an alkylsulfonylamino group, or an arylalkylsulfonylamino group.

10. The optical absorbent of claim 1, wherein the optical absorbent is represented by Chemical Formula 3:

[Chemical Formula 3]

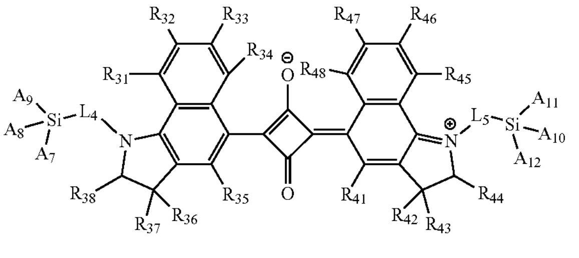

wherein $A_7$ to $A_{12}$ are each independently hydrogen, halogen, an alkyl group, an alkenyl group, an alkoxy group, an aryl group, or an arylalkyl group;

$L_4$ and $L_5$ are each independently the same as $L_1$ in Chemical Formula 1; and $R_{31}$ to $R_{38}$ and $R_{41}$ to $R_{48}$ are each independently hydrogen, halogen, a hydroxyl group, a cyano group, a nitro group, a carboxyl group, an alkyl group, an alkoxy group, an aryl group, an arylalkyl group, an amino group, an alkylcarbonylamino group, an arylalkylcarbonylamino group, a haloalkylsulfonylamino group, an alkylsulfonylamino group, or an arylalkylsulfonylamino group.

11. The optical absorbent of claim 1, wherein the optical absorbent is represented by Chemical Formula 4:

[Chemical Formula 4]

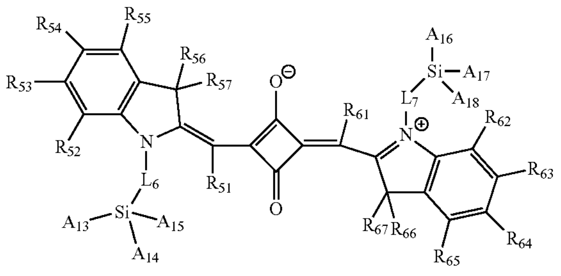

wherein $A_{13}$ to $A_{18}$ are each independently hydrogen, halogen, an alkyl group, an alkenyl group, an alkoxy group, an aryl group, or an arylalkyl group;

$L_6$ and $L_7$ are each independently the same as $L_1$ in Chemical Formula 1; and $R_{51}$ to $R_{57}$ and $R_{61}$ to $R_{67}$ are each independently hydrogen, halogen, a hydroxyl group, a cyano group, a nitro group, a carboxyl group, an alkyl group, an alkoxy group, an aryl group, an arylalkyl group, an amino group, an alkylcarbonylamino group, an arylalkylcarbonylamino group, a haloalkylsulfonylamino group, an alkylsulfonylamino group, or an arylalkylsulfonylamino group.

12. An optical absorbent composition comprising:

a resin component; and an optical absorbent represented by Chemical Formula 1:

[Chemical Formula 1]

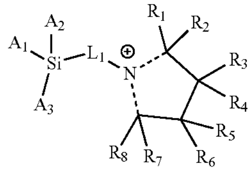

wherein $A_1$ to $A_3$ are each independently hydrogen, halogen, an alkyl group, an alkenyl group, an alkynyl group, an alkoxy group, an aryl group, or an arylalkyl group;

$L_1$ is $-U_1-T_1-U_2-T_2-U_3-$ where $T_1$ and $T_2$ are each independently an oxygen atom or absent and $U_1$ to $U_3$ are each independently an alkylene group, an alkylidene group, an alkenylene group, an alkynylene group, or absent;

$R_1$ and $R_2$, $R_1$ to $R_6$, $R_3$ to $R_6$, or $R_5$ to $R_8$ in $R_1$ to $R_8$ form an absorption edge and substituents which do not form the absorption edge among $R_1$ to $R_8$ are each independently hydrogen, halogen, a hydroxyl group, a cyano group, a nitro group, a carboxyl group, an alkyl group, an alkoxy group, an aryl group, an arylalkyl group, an alkylcarbonylamino group, an arylalkylcarbonylamino group, a haloalkylsulfonylamino group, an alkylsulfonylamino group, an arylalkylsulfonylamino group, or an amino group; and two dotted lines in Chemical Formula 1 represent as either a single bond or a double bond wherein each one of the two dotted lines represents as the single bond and the double bond, respectively, or both the two dotted lines represent as the single bond and a cation symbol in Chemical Formula 1 is absent upon both the dotted lines representing as the single bond.

13. The optical absorbent composition of claim 12, wherein the resin component comprises at least one selected from a group consisted of a cyclo olefin polymer (COP)-based resin, a polyarylate resin, a polysulfone resin, a polyether sulfone resin, a polyparaphenylene resin, a polyarylene ether phosphineoxide resin, a polyimide resin, a polyetherimide resin, a polyamideimide resin, an acrylic resin, a polycarbonate resin, a polyethylene naphthalate resin, and a silicone resin.

14. The optical absorbent composition of claim 12, wherein the resin component comprises a silicone resin.

15. The optical absorbent composition of claim 12, wherein the optical absorbent composition comprises the optical absorbent of 0.001 to 10 parts by weight with respect to 100 parts by weight of the resin component.

16. The optical absorbent composition of claim 12, further comprising a solvent.

17. An optical absorption film comprising:

a resin component; and an optical absorbent represented by Chemical Formula 1:

[Chemical Formula 1]

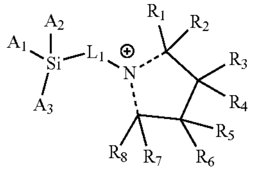

wherein $A_1$ to $A_3$ are each independently hydrogen, halogen, an alkyl group, an alkenyl group, an alkynyl group, an alkoxy group, an aryl group, or an arylalkyl group;

$L_1$ is $-U_1-T_1-U_2-T_2-U_3-$ where $T_1$ and $T_2$ are each independently an oxygen atom or absent and $U_1$ to $U_3$ are each independently an alkylene group, an alkylidene group, an alkenylene group, an alkynylene group, or absent;

$R_1$ and $R_2$, $R_1$ to $R_6$, $R_3$ to $R_6$, or $R_5$ to $R_8$ in $R_1$ to $R_8$ form an absorption edge and substituents which do not form the absorption edge among $R_1$ to $R_8$ are each independently hydrogen, halogen, a hydroxyl group, a cyano group, a nitro group, a carboxyl group, an alkyl group, an alkoxy group, an aryl group, an arylalkyl group, an alkylcarbonylamino group, an arylalkylcarbonylamino group, a haloalkylsulfonylamino group, an alkylsulfonylamino group, an arylalkylsulfonylamino group, or an amino group; and two dotted lines in Chemical Formula 1 represent as either a single bond or a double bond wherein each one of the two dotted lines represents as the single bond and the double bond, respectively, or both the two dotted lines represent as the single bond and a cation symbol in Chemical Formula 1 is absent upon both the dotted lines representing as the single bond.

18. The optical absorption film of claim 17, wherein the resin component comprises at least one selected from a group consisted of a cyclo olefin polymer (COP)-based resin, a polyarylate resin, a polysulfone resin, a polyether sulfone resin, a polyparaphenylene resin, a polyarylene ether phosphineoxide resin, a polyimide resin, a polyetherimide resin, a polyamideimide resin, an acrylic resin, a polycarbonate resin, a polyethylene naphthalate resin, and a silicone resin.

19. The optical absorption film of claim 17, wherein an absolute value of ΔA of Equation 1 is 20% or less:

$$\Delta A=100\times(A_f-A_i)/A_i \quad \text{[Equation 1]}$$

wherein $A_f$ is a transmittance at the absorption maximum wavelength of the optical absorption film being maintained at 85° C. and under 85% relative humidity for 120 hours;

$A_i$ is a transmittance at the absorption maximum wavelength of the optical absorption film before being maintained at 85° C. and under 85% relative humidity for 120 hours; and the absorption maximum wavelength exists within a wavelength range of 600 nm to 950 nm.

20. The optical absorption film of claim 17, wherein an absolute value of Δλ of Equation 2 is 10% or less:

$$\Delta\lambda=100\times(\lambda_f-\lambda_i)/\lambda_i \quad \text{[Equation 2]}$$

wherein $\lambda_f$ is the maximum absorption wavelength of the optical absorption film being maintained at 85° C. and under 85% relative humidity for 120 hours;

$\lambda_i$ is the maximum absorption wavelength of the optical absorption film before being maintained at 85° C. and under 85% relative humidity for 120 hours; and the absorption maximum wavelength exists within a wavelength range of 600 nm to 950 nm.

* * * * *